(12) United States Patent
Nomura et al.

(10) Patent No.: US 8,243,606 B2
(45) Date of Patent: Aug. 14, 2012

(54) INFORMATION ACQUISITION DEVICE AND METHOD

(75) Inventors: Yuji Nomura, Kawasaki (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 12/625,722

(22) Filed: Nov. 25, 2009

(65) Prior Publication Data

US 2010/0067549 A1    Mar. 18, 2010

Related U.S. Application Data

(63) Continuation of application No. PCT/JP2007/061140, filed on May 31, 2007.

(51) Int. Cl.
*H04L 1/00* (2006.01)
(52) U.S. Cl. .................................................. 370/241
(58) Field of Classification Search .......... 370/241–253, 370/464, 465, 474; 709/227–229, 238–243
See application file for complete search history.

(56) References Cited

U.S. PATENT DOCUMENTS

| | | | |
|---|---|---|---|
| 6,366,582 B1 | 4/2002 | Nishikado et al. | |
| 7,742,414 B1 * | 6/2010 | Iannaccone et al. | 370/231 |
| 7,773,611 B2 * | 8/2010 | Booth et al. | 370/401 |
| 7,823,194 B2 * | 10/2010 | Shay | 726/13 |
| 7,945,661 B2 * | 5/2011 | Lehane et al. | 709/224 |

FOREIGN PATENT DOCUMENTS

| | | |
|---|---|---|
| JP | 11-163942 | 6/1999 |
| JP | 2001-274793 | 10/2001 |
| JP | 2004-282364 | 10/2004 |
| JP | 2004-349972 | 12/2004 |
| JP | 2005-5820 | 1/2005 |
| JP | 2006-32997 | 2/2006 |
| JP | 2006-253824 | 9/2006 |

OTHER PUBLICATIONS

International Search Report dated Jun. 26, 2007, from the corresponding International Application.

* cited by examiner

*Primary Examiner* — Dmitry H Levitan
(74) *Attorney, Agent, or Firm* — Fujitsu Patent Center

(57) ABSTRACT

A device includes a storage unit that stores in a predetermined unit an identifier acquired from a packet transmitted from a transmitting device in association with a source address. The transmitting device receives from each terminal device connected communicatable via a network a packet including a source address, an identifier generated by adding a numerical value every time a packet is sent by the terminal device, and a session ID, and converts and transmits the source address. The transmitting device and the terminal device are connected to the device via a different network. The device also includes a determining unit that determines whether the identifier stored has monotonically increased; and a detector that detects a source indicated by a certain source address to be the transmitting device, if the determining unit determines that the identifier for the certain source address has not monotonically increased.

8 Claims, 14 Drawing Sheets

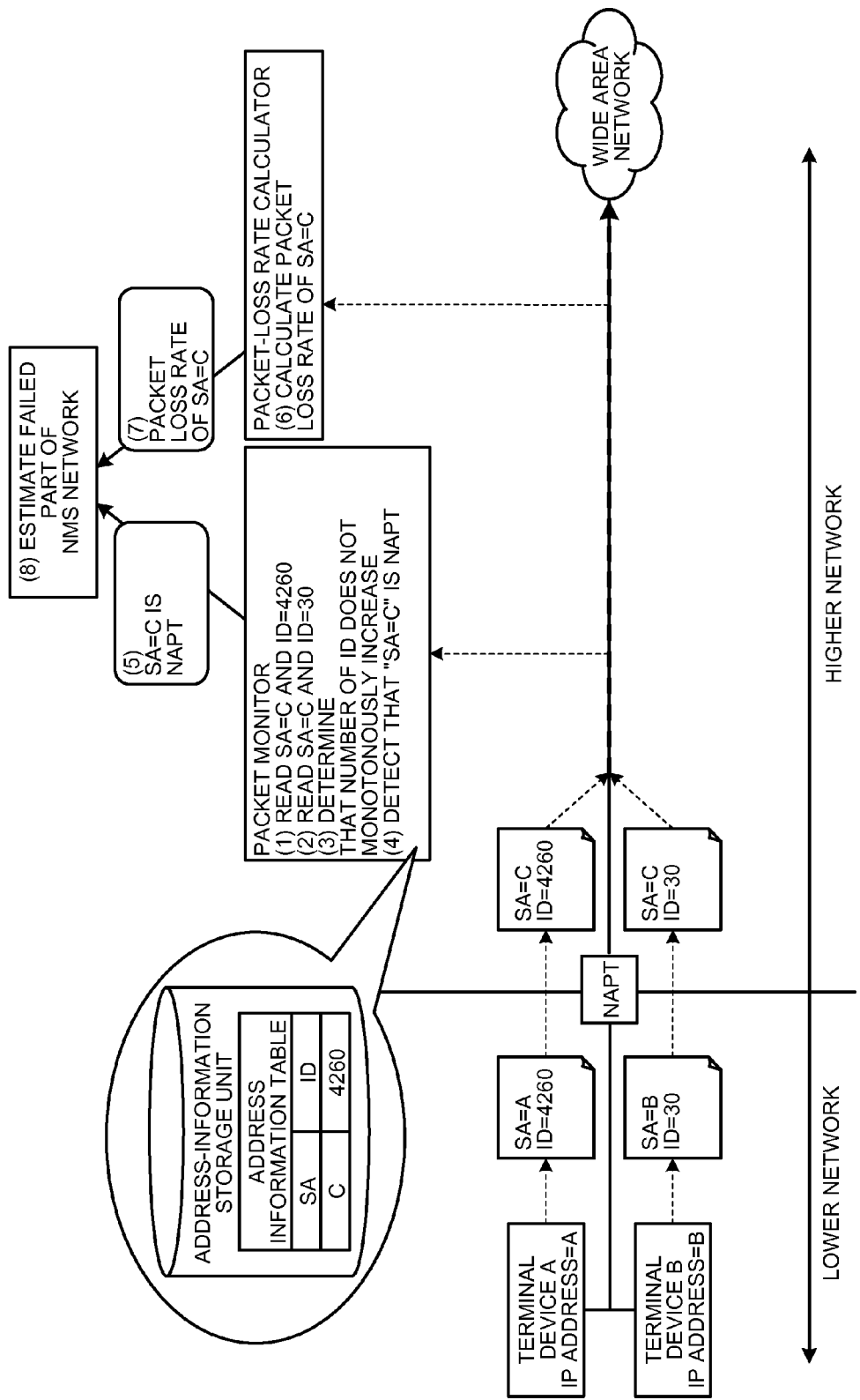

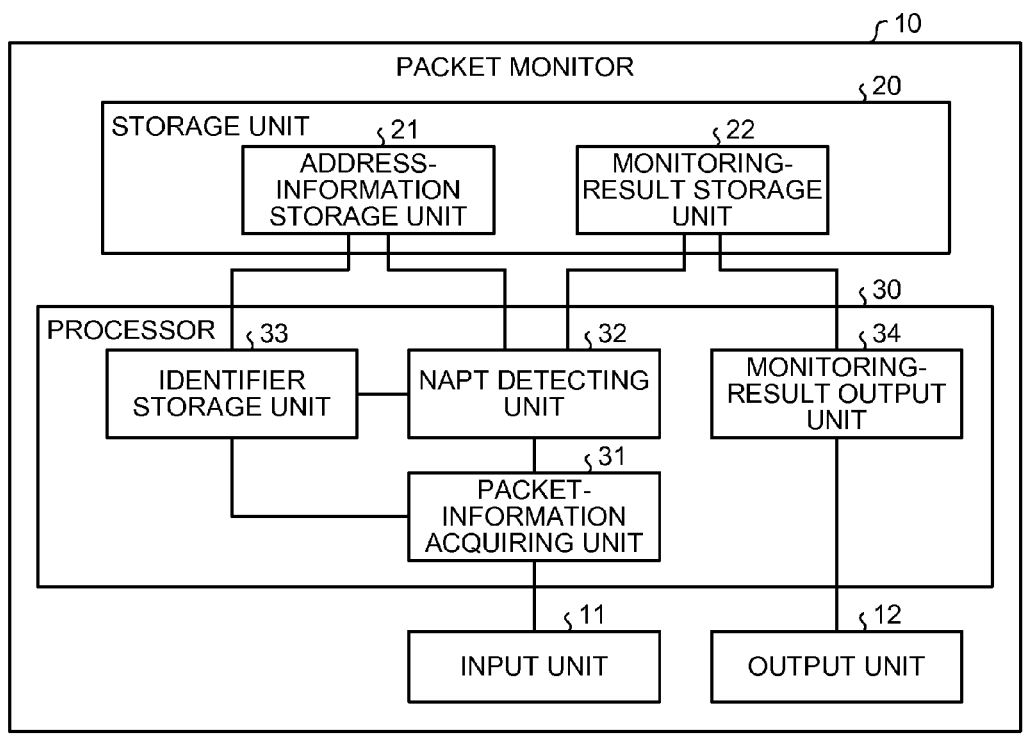

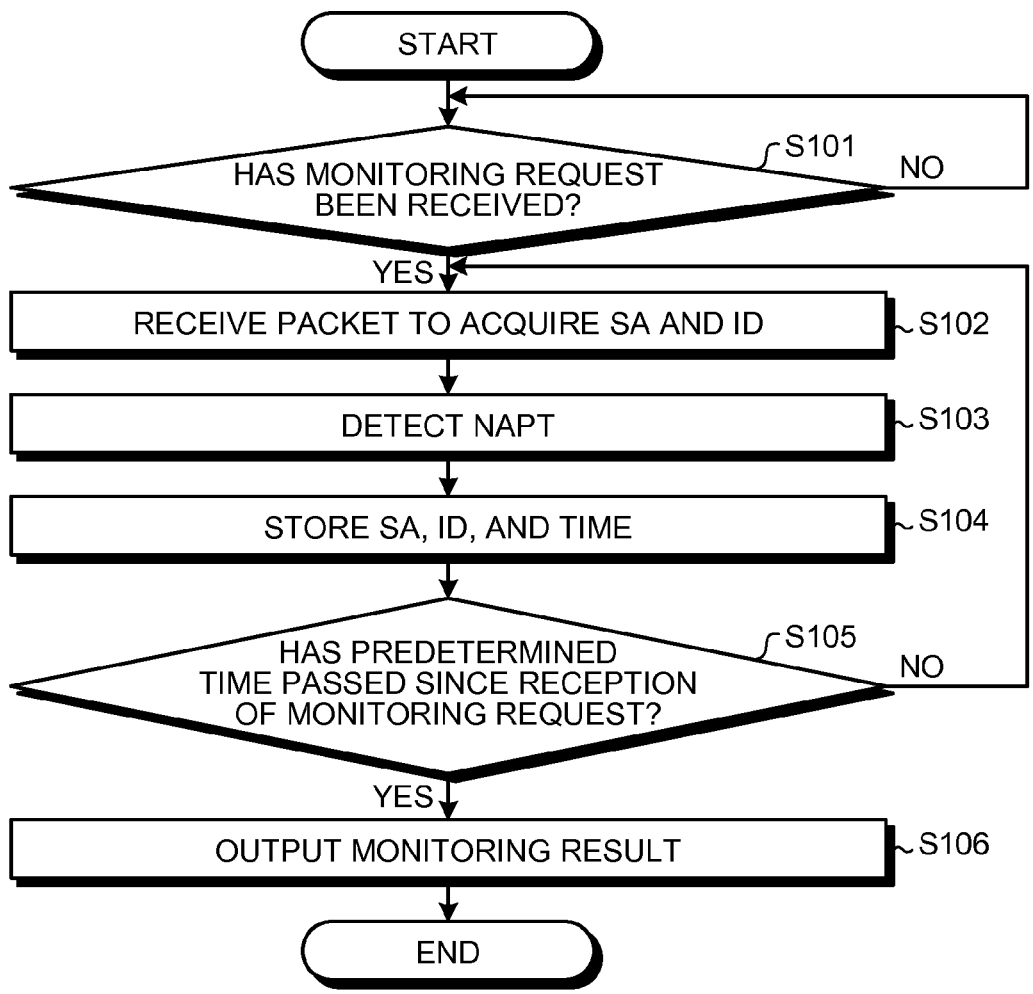

| CALCULATION RESULT OF PACKET LOSS RATE ||||||||
|---|---|---|---|---|---|---|
| SESSION ID | DA | DP | SA | SP | PACKET LOSS RATE | START TIME |
| S-1 | E | P-1 | C | P-5 | 0% | 14:50:01 |
| S-2 | E | P-2 | C | P-6 | 4% | 14:50:02 |
| S-3 | E | P-3 | C | P-7 | 5% | 14:50:03 |
| S-4 | E | P-4 | D | P-8 | 0% | 14:50:04 |

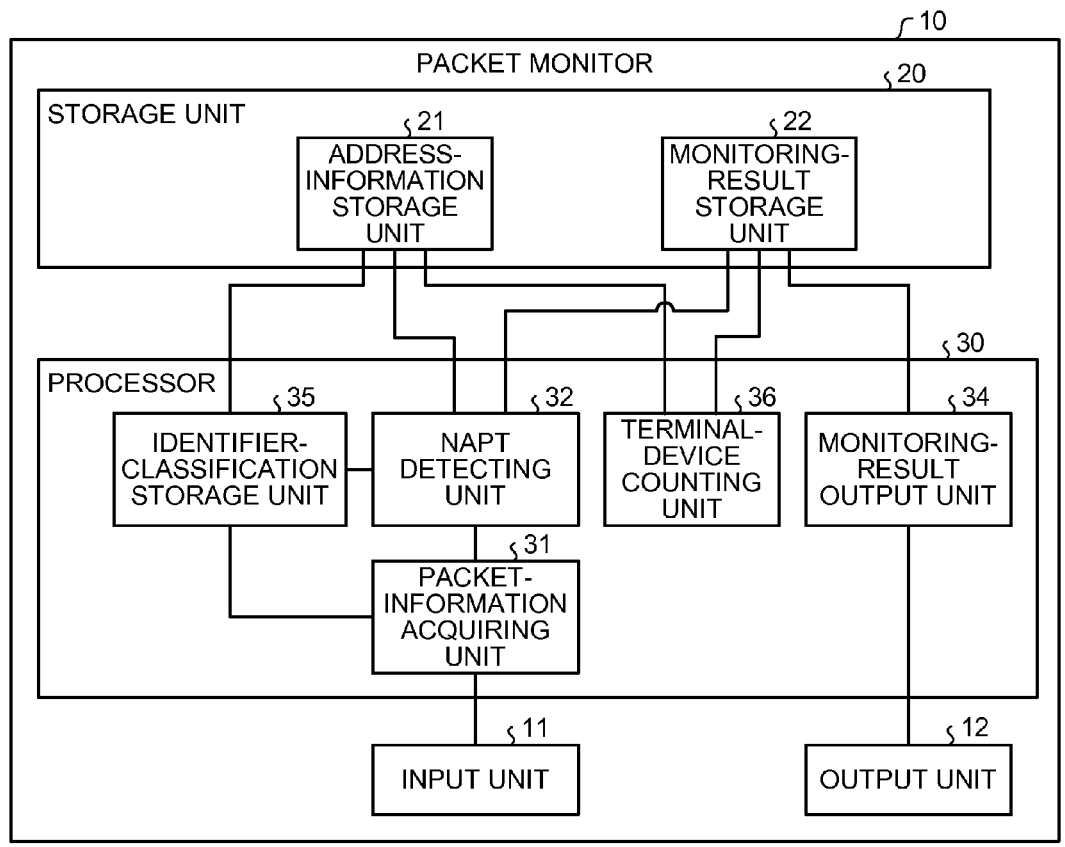

FIG.11

| MONITORING RESULT | | |
|---|---|---|
| SA | PRESENCE OF NAPT | NUMBER OF TERMINALS |
| C | Yes | 2 |
| D | No | 1 |

FIG.13A

| CALCULATION RESULT OF PACKET LOSS RATE ||||||||
|---|---|---|---|---|---|---|
| SESSION ID | DA | DP | SA | SP | PACKET LOSS RATE | START TIME |
| S-1 | E | P-1 | C | P-5 | 0% | 14:50:01 |
| S-2 | E | P-2 | C | P-6 | 4% | 14:50:02 |
| S-3 | E | P-3 | C | P-7 | 5% | 14:50:03 |

FIG.13B

| CALCULATION RESULT OF PACKET LOSS RATE ||||||||
|---|---|---|---|---|---|---|
| SESSION ID | DA | DP | SA | SP | PACKET LOSS RATE | START TIME |
| S-1 | E | P-1 | C | P-5 | 0% | 14:50:10 |

FIG.14A

| ADDRESS INFORMATION TABLE |||
|---|---|---|
| SA | ID | TIME |
| C | 4260 | 14:50:01 |
| D | 3253 | 14:50:06 |

FIG.14B

| SA=C TABLE |||||
|---|---|---|---|---|
| TERMINAL ID | SESSION ID | ID | FORMER SESSION ID | DELETED SESSION ID |
| T-1 | S-1 | 4260 | fS-1 | dS-2, dS-3 |
| T-2 | S-2, S-3 | 31 | fS-3 | |

FIG.14C

| SESSION TABLE C |||
|---|---|---|
| SESSION ID | TERMINAL ID | START TIME |
| 1 | T-1 | 14:50:01 |
| 2 | T-2 | 14:50:02 |
| 3 | T-2 | 14:50:03 |

| ADDRESS INFORMATION TABLE | | |
|---|---|---|
| SA | ID | TIME |
| C | 4260 | 14:50:01 |

| SA=C TABLE | | | | | |
|---|---|---|---|---|---|
| TERMINAL ID | SESSION ID | ID | FORMER SESSION ID | DELETED SESSION ID | |
| T-1 | S-1 | 4262 | fS-1 | dS-2, dS-3 | |
| T-2 | S-2, S-3 | 31 | fS-3 | | |

| SESSION TABLE C | | |
|---|---|---|
| SESSION ID | TERMINAL ID | START TIME |
| S-1 | T-1 | 14:50:01 |
| S-2 | T-2 | 14:50:02 |
| S-3 | T-2 | 14:50:03 |

(B)

| ADDRESS INFORMATION TABLE | | |
|---|---|---|
| SA | ID | TIME |
| C | 4260 | 14:50:01 |

| SA=C TABLE | | | | |
|---|---|---|---|---|
| TERMINAL ID | SESSION ID | ID | FORMER SESSION ID | DELETED SESSION ID |
| T-1 | S-1, S-4 | 10000 | fS-4 | |
| T-2 | S-2, S-3 | 31 | fS-3 | dS-2, dS-3 |

| SESSION TABLE C | | |
|---|---|---|
| SESSION ID | TERMINAL ID | START TIME |
| S-1 | T-1 | 14:50:01 |
| S-2 | T-2 | 14:50:02 |
| S-3 | T-2 | 14:50:03 |
| S-4 | T-1 | 14:50:05 |

(C)

| ADDRESS INFORMATION TABLE | | |
|---|---|---|
| SA | ID | TIME |
| C | 4260 | 14:50:01 |

| SA=C TABLE | | | | |
|---|---|---|---|---|
| TERMINAL ID | SESSION ID | ID | FORMER SESSION ID | DELETED SESSION ID |
| T-1 | S-1 | 4263 | fS-1 | dS-2, dS-3, dS-4 |
| T-2 | S-2, S-3, S-4 | 10000 | fS-4 | |

| SESSION TABLE C | | |
|---|---|---|
| SESSION ID | TERMINAL ID | START TIME |
| S-1 | T-1 | 14:50:01 |
| S-2 | T-2 | 14:50:02 |
| S-3 | T-2 | 14:50:03 |
| S-4 | T-2 | 14:50:06 |

(D)

| ADDRESS INFORMATION TABLE | | |
|---|---|---|
| SA | ID | TIME |
| C | 4260 | 14:50:01 |

| SA=C TABLE | | | | |
|---|---|---|---|---|
| TERMINAL ID | SESSION ID | ID | FORMER SESSION ID | DELETED SESSION ID |
| T-1 | S-1 | 4263 | fS-1 | dS-2, dS-3, dS-4 |
| T-2 | S-2, S-3, S-4 | 32 | fS-2 | dS-4 |
| T-3 | S-4 | 10000 | fS-4 | |

| SESSION TABLE C | | |
|---|---|---|
| SESSION ID | TERMINAL ID | START TIME |
| S-1 | T-1 | 14:50:01 |
| S-2 | T-2 | 14:50:02 |
| S-3 | T-2 | 14:50:03 |
| S-4 | T-3 | 14:50:07 |

| CALCULATION RESULT OF PACKET LOSS RATE ||||||
|---|---|---|---|---|---|
| SESSION ID | DA | DP | SA | SP | PACKET LOSS RATE | START TIME |
| S-1 | E | P-1 | C | P-5 | 0% | 14:50:01 |
| S-2 | E | P-2 | C | P-6 | 4% | 14:50:02 |
| S-3 | E | P-3 | C | P-7 | 5% | 14:50:03 |
| S-4 | E | P-4 | C | P-8 | 0% | 14:50:04 |

INFORMATION ACQUISITION DEVICE AND METHOD

CROSS-REFERENCE TO RELATED APPLICATION

This application is a continuation of International Application No. PCT/JP2007/061140, filed on May 31, 2007, the entire contents of which are incorporated herein by reference.

FIELD

The embodiments discussed herein are directed to an information acquisition device, an information acquisition method, and an information acquisition program.

BACKGROUND

Conventionally, a transmission device constituting a communication network, which is an address converting and transmitting device that converts and transmits network information stored in a packet has been proposed. Specifically, for example, when the address converting and transmitting device (for example, network address port translator (NAPT) and network address translator (NAT) (hereinafter, collectively NAPT), transmits a packet from a lower network configured at a level lower than the NAPT (for example, local area network (LAN)) to a higher network configured at a level higher than the NAPT (for example, wide area network (WAN)), a source address (private source address) specific to each terminal device, which is added to the packet upon sending of the packet by each terminal device connected via the lower network, is converted to an identical source address corresponding to the higher network (global source address) to transmit the packet.

A packet monitor acquires predetermined information from a packet transferred on a network (e.g., see Japanese Laid-open Patent Publication No. 2006-32997). Specifically, the packet monitor acquires a session ID, a source address, a source port number, a destination address, a destination port number, an identifier generated by adding a numerical value every time a packet is sent by a terminal device, and a serial number added at the time of dividing predetermined information into a plurality of packets and used at the time of reconstructing the information. The packet monitor acquires the session ID, source address, and serial number to calculate a packet loss rate by monitoring absence of a serial number for each session ID and source address. The packet loss rate calculated by the packet monitor is used to estimate a fault location of communications in the network by a network management system (NMS) or the like that manages the network.

However, in the above conventional technique, it is not possible to determine whether a source indicated by a source address is the NAPT or the terminal device.

That is, the packet monitor acquires the global source address and the private source address without identifying them. As a result, for example, when the NMS estimates a fault location of communications in the network, it is not possible to determine whether a source of a packet for which a packet loss has occurred is a terminal device connected via the NAPT. In other words, it has been difficult to cut and divide the fault location in the network between the higher network and the lower network by the mere packet loss rate measured by the packet monitor in the higher network.

SUMMARY

According to an aspect of an embodiment of the invention, an information acquisition device includes: an identifier storage unit that stores in a predetermined storage unit an identifier acquired from a transmission packet transmitted from an address converting and transmitting device in association with a source address, the address converting and transmitting device receiving from each terminal device connected communicatable via a network a packet including a source address, an identifier generated by adding a numerical value every time a packet is sent by the terminal device, and a session ID, the address converting and transmitting device converting and transmitting the source address, the address converting and transmitting device and the terminal device being connected to the information acquisition device via a different network; an identifier determining unit that determines whether the identifier stored in the predetermined storage unit in association with each source address has monotonically increased; and an address converting and transmitting device detector that detects a source indicated by a certain source address to be the address converting and transmitting device, if the identifier determining unit determines that the identifier for the certain source address has not monotonically increased.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a schematic diagram for explaining an outline and features of a packet monitor according to a first embodiment of the present invention;

FIG. 2 is a block diagram of a configuration of the packet monitor according to the first embodiment;

FIG. 3 is an example of information to be stored in an address-information storage unit according to the first embodiment;

FIG. 4 is an example of information to be stored in a monitoring-result storage unit according to the first embodiment;

FIG. 5 is a flowchart of an entire process flow performed by the packet monitor according to the first embodiment when a monitoring request is received;

FIG. 9 is a block diagram of a configuration of the packet monitor according to the second embodiment;

FIGS. 10A and 10B are examples of information stored in an address-information storage unit according to the second embodiment;

FIG. 11 is an example of information stored in a monitoring-result storage unit according to the second embodiment;

FIGS. 13A and 13B are tables for explaining effects of the second embodiment;

FIGS. 14A to 14C are examples of information stored in an address-information storage unit according to a third embodiment of the present invention;

FIG. 16 is an illustration for explaining an example of a process performed by the packet monitor according to the third embodiment;

DESCRIPTION OF EMBODIMENT(S)

Figure 6:
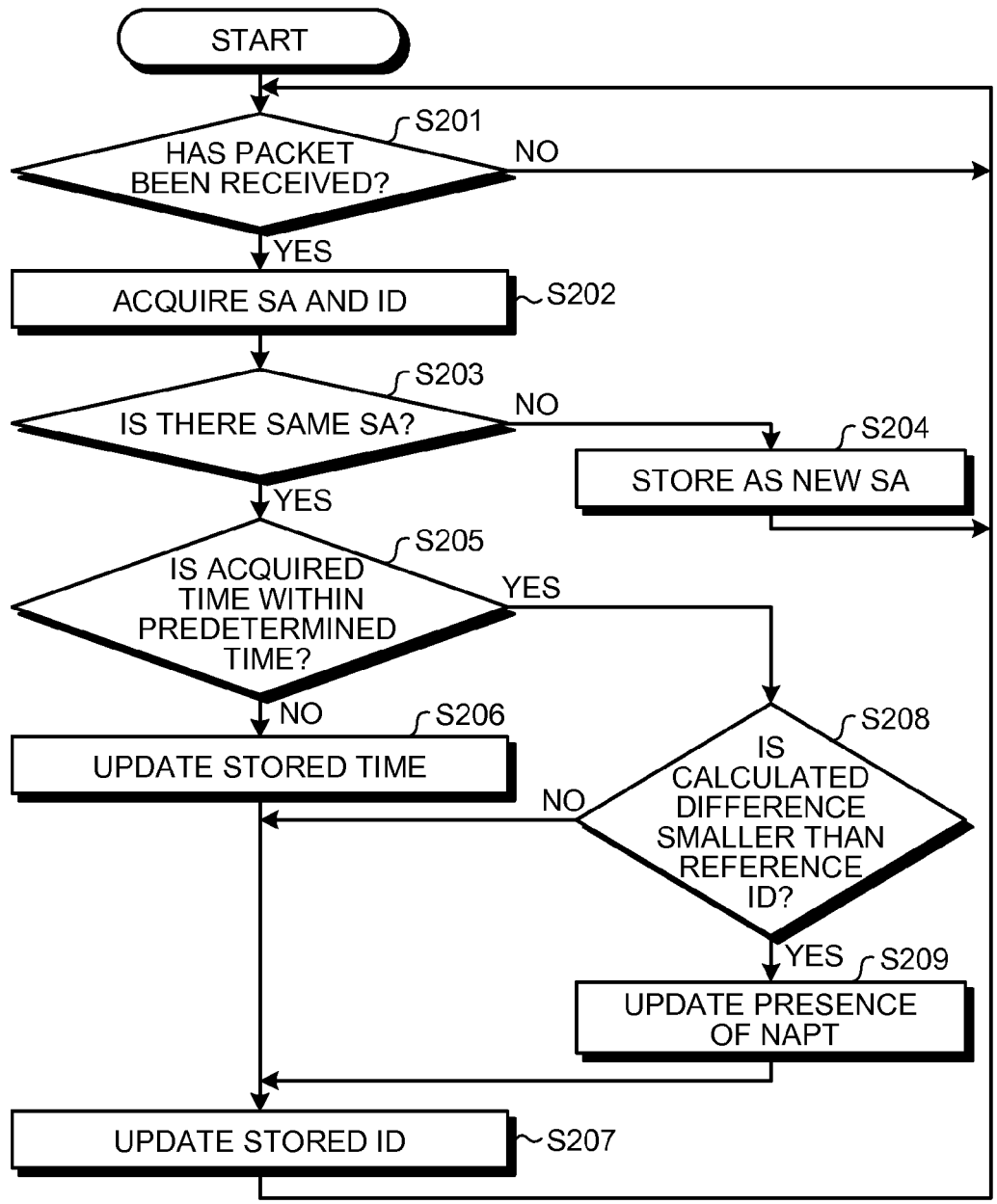
FIG. 6 is a flowchart of a process flow performed by the packet monitor according to the first embodiment when a packet is received.

Preferred embodiments of the present invention will be explained with reference to accompanying drawings. The present invention is applied to a packet monitor that monitors packets transferred on a network, and the following embodiments are explained as an example in which a monitoring request from a NMS that manages the network is received, information is acquired from the packet to acquire a monitoring result, and the monitoring result is output to the NMS. A fault location of communications in a network is estimated by an NMS by using the monitoring result acquired by the present invention, a session ID calculated by a packet loss-rate calculator as another packet monitor, and a packet loss rate corresponding to a source address.

[a] First Embodiment

Outline and Features of Packet Monitor According to First Embodiment

An outline and features of a packet monitor according to a first embodiment are explained first with reference to FIG. 1. FIG. 1 is a schematic diagram for explaining the outline and features of the packet monitor.

As illustrated in FIG. 1, the packet monitor according to the first embodiment is connected via a higher network (for example, WAN) formed at a higher level than an address converting and transmitting device (hereinafter, NAPT, where appropriate) that converts and transmits a source address. The packet monitor receives a packet including a source address, an identifier generated by adding a numerical value every time a packet is sent by a terminal device, and a session ID from each terminal device communicably connected via a lower network configured at a lower level than the NAPT to acquire predetermined information from a transmission packet transmitted from the NAPT.

As such, the packet monitor according to the first embodiment is able to detect a source indicated by a predetermined source address to be a NAPT. As a result, the packet monitor is able to cut and divide the fault location easily.

In explaining the main features, as illustrated in FIG. 1, it is assumed that a terminal device A connected to the lower network of the NAPT acquires "A" as an IP address (hereinafter, "IP=A", where appropriate) at the time of startup, generates an arbitrary numerical value (for example, "4260") as a numerical value described in an identification field of an IP header (hereinafter, "identifier (ID)"), and adds "A" as a source address (SA) (hereinafter, "SA=A") and "4260" as an ID (hereinafter, "ID=4260") to a first sending packet to send the packet. At the time of sending a next packet, the terminal device A adds "SA=A" and "ID=4261" generated by adding "1" to "4260" to the next packet and sends the packet. When the packet is transmitted from the lower network to the higher network by the NAPT, "SA=A", which is a private source address added to the sending packet sent by the terminal device A is converted to "SA=C", which is a global source address, and the ID (for example, "ID=4260") is held.

It is also assumed that a terminal device B connected to the lower network of the NAPT acquires "IP=B" and generates an arbitrary numerical value (for example, "30") as the ID at the time of startup, and adds "SA=B" and "ID=30" to a sending packet at the time of sending the packet. When the packet is transmitted from the lower network to the higher network by the NAPT, "SA=B", which is a private source address added to the sending packet sent by the terminal B is converted to "SA=C", which is a global source address, and the ID (for example, "ID=30") is held as it is.

Upon such an assumption, the packet monitor according to the first embodiment stores the ID acquired from the transmission packet in an address-information storage unit in association with the SA. Specifically, for example, as illustrated at (1) in FIG. 1, upon reception of a monitoring request from an NMS, the packet monitor receives a transmission packet sent from the terminal device A and then transmitted by the NAPT and acquires "SA=C" and "ID=4260" from the transmission packet to store these pieces of information in the address-information storage unit. Likewise, as illustrated at (2) in FIG. 1, the packet monitor receives a transmission packet sent from the terminal device B and then transmitted by the NAPT and acquires "SA=C" and "ID=30" from the transmission packet.

The packet monitor determines whether the ID stored in the address-information storage unit in association with each SA has monotonically increased (see (3) in FIG. 1). Specifically for example, a record in which "SA=C" is stored is searched from the SAs stored in the address-information storage unit based on "SA=C" acquired from the transmission packet. The packet monitor reads "ID=4260" stored in the searched record, and subtracts "ID=4260" from "ID=30" acquired from the transmission packet to calculate a difference "−4230". The packet monitor compares a calculated difference with a reference ID (for example, "−5") for determining whether the ID has monotonically increased, and when the calculated difference is smaller than the reference ID, determines that the ID stored in the address-information storage unit in association with "SA=C" has not monotonically increased. When having determined that the ID at a predetermined SA has not monotonically increased, the packet monitor detects a source indicated by the SA to be the NAPT. Specifically for example, when "SA=C" indicates one terminal device, since the ID is generated by adding a numerical value every time a packet is sent, the ID larger than "ID=4260" is supposed to be added to a next packet, which is "SA=C". Because a difference "−4230" calculated by subtracting "ID=4260" from "ID=30" actually acquired is smaller than the reference ID "−5", the packet monitor determines that the "ID=30" has been added to a packet sent from another terminal device. Thus, as illustrated at (4) in FIG. 1, the packet monitor detects that "SA=C" is the NAPT. As illustrated at (5) in FIG. 1, the packet monitor outputs "monitoring result indicating SA=C is NAPT" to the NMS.

Thereafter, as illustrated at (6) in FIG. 1, a packet loss-rate calculator calculates a packet loss rate of "SA=C", and as illustrated at (7) in FIG. 1, the packet loss rate of "SA=C" is output to the NMS. As illustrated at (8) in FIG. 1, the NMS estimates a fault location of the network by using the received message of "monitoring result indicating that "SA=C is NAPT" from the packet monitor and the packet loss rate of "SA=C" from the packet loss-rate calculator.

As described above, the packet monitor according to the first embodiment is configured to detect the source indicated by a certain source address to be the NAPT, and can easily separate the fault location as a result. That is, for example, upon estimating the fault location of communications in the network by using the packet loss rate, it is possible to determine that the source of the packet for which a packet loss has occurred, is the terminal device connected via the NAPT, and thus to consider a possibility that a communication failure has occurred in the lower network.

Configuration of Packet Monitor According to First Embodiment

A configuration of the packet monitor illustrated in FIG. 1 is explained with reference to FIG. 2. FIG. 2 is a block diagram of a configuration of the packet monitor according to the first embodiment. As illustrated in FIG. 2, a packet monitor 10 includes an input unit 11, an output unit 12, a storage unit 20, and a processor 30.

The input unit 11 receives an input of various pieces of information and various operations, and corresponds to a single reception port or plural reception ports, for example. Specifically, the input unit 11 receives a monitoring request from an NMS and receives a packet from a higher network.

The output unit 12 outputs various pieces of information and corresponds to a single transmission port or plural transmission ports, for example. Specifically, the output unit 12 outputs a monitoring result to the NMS.

The storage unit 20 stores data and programs for various processes by the processor 30. As structural elements closely relevant to the present invention, as illustrated in FIG. 2, the storage unit 20 includes an address-information storage unit 21 and a monitoring-result storage unit 22.

The address-information storage unit 21 stores information acquired from a transmission packet. Specifically for example, as illustrated in FIG. 3, the address-information storage unit 21 stores an ID (for example, "4260") acquired from the transmission packet and a sending packet sent from a terminal device connected to the network without using an NAPT, and a time (for example, 14:50:01) at which information is acquired from the transmission packet, in association with the SA (for example, "C") acquired from the transmission and sending packets, as an address information table. FIG. 3 is an example of information to be stored in the address-information storage unit according to the first embodiment. The SA already stored in the address-information storage unit 21 is expressed as "stored SA" where appropriate, an ID already stored in the address-information storage unit 21 is expressed as "stored ID" where appropriate, and a time already stored in the address-information storage unit 21 is expressed as "stored time" where appropriate.

The monitoring-result storage unit 22 stores a monitoring result acquired by the packet monitor. To explain with a specific example, as illustrated in FIG. 4 the monitoring-result storage unit 22 stores presence of an NAPT (for example, "YES" or "NO") in association with an SA (for example, "C") as the monitoring result. FIG. 4 is an example of information to be stored in the monitoring-result storage unit according to the first embodiment.

The processor 30 includes an internal memory for storing programs and data specifying various procedural steps, and performs various processes according to the programs and data. As constituent elements closely relevant to the present invention, the processor 30 includes a packet-information acquiring unit 31, an NAPT detecting unit 32, an identifier storage unit 33, and a monitoring-result output unit 34. The NAPT detecting unit 32 corresponds to "address converting and transmitting device detector" and "identifier determining unit" described in the appended claims, and the identifier storage unit 33 corresponds to "identifier storage unit" and "identifier determining unit" described in the claims.

The packet-information acquiring unit 31 acquires predetermined information from a packet transferred on the network. Specifically, upon reception of a monitoring request from the NMS via the input unit 11, the packet-information acquiring unit 31 receives a transmission packet transmitted from the NAPT and a sending packet sent from the terminal device via the input unit 11. The packet-information acquiring unit 31 acquires an SA (for example, "SA=C") and an ID (for example, "ID=30") added to the packet from the received transmission and sending packets. The packet-information acquiring unit 31 sends an SA, an ID, and a time at which information is acquired (for example, 14:50:02) to the NAPT detecting unit 32 and the identifier storage unit 33. An SA actually acquired by the packet-information acquiring unit 31 is expressed as "acquired SA" where appropriate, an ID actually acquired by the packet-information acquiring unit 31 is expressed as "acquired ID" where appropriate, and a time at which information is acquired from the transmission and sending packets actually received by the packet-information acquiring unit 31 is expressed as "acquired time" where appropriate.

The NAPT detecting unit 32 respectively determines whether the ID stored in a predetermined storage unit in association with each source address has monotonically increased, and when having determined that the ID at a predetermined SA has not monotonically increased, the NAPT detecting unit 32 detects the source indicated by the SA as the NAPT.

To explain with a specific example, upon reception of an acquired SA (for example, "SA=C"), an acquired ID (for example, "ID=30"), and an acquired time (for example, 14:50:02) from the packet-information acquiring unit 31, the NAPT detecting unit 32 searches for a record, in which a stored SA same as the acquired SA is stored, from the address information table. When there is no stored SA same as the acquired SA in the address information table, the NAPT detecting unit 32 informs the identifier storage unit 33 that "a new record is generated". When there is a stored SA same as the acquired SA, the NAPT detecting unit 32 reads a stored time (for example, 14:50:01) from the record in which the stored SA same as the acquired SA is stored, to determine whether the acquired time is longer than the stored time by a predetermined time (for example, 1 second).

When the acquired time is longer than the stored time by a predetermined time, the NAPT detecting unit 32 informs the identifier storage unit 33 that "the stored time is to be updated to the acquired time". When the acquired time is within a predetermined time with respect to the stored time, the NAPT detecting unit 32 reads the stored ID from the record in which the stored SA same as the acquired SA is stored in the address information table, and subtracts the stored ID (for example, ID=4260") from the acquired ID (for example, "ID=30") to calculate a difference (for example, "−4230"). The NAPT detecting unit 32 compares the difference with a reference ID (for example, "−5") for determining whether the ID specified by a user has monotonically increased, to determine whether a calculated difference is smaller than the reference ID. When the calculated difference is larger than the reference ID, the NAPT detecting unit 32 informs the identifier storage unit 33 that "the stored ID is to be updated to the acquired ID". When the calculated difference is smaller than the reference ID, the NAPT detecting unit 32 updates the presence of the NAPT corresponding to the same SA stored in the monitoring-result storage unit 22 from "NO" to "YES", and informs the identifier storage unit 33 that "NAPT has been detected".

The identifier storage unit 33 stores the ID acquired from the packet transferred on the network in a predetermined storage unit in association with the SA. Specifically for example, when having received an acquired SA, an acquired ID, and an acquired time from the packet-information acquiring unit 31, as well as a message of "new record is to be generated" from the NAPT detecting unit 32, the identifier storage unit 33 stores an acquired ID (for example "4260") and the acquired time (for example, 14:50:01) in the address information table in association with the acquired SA (for example, "C") as a new SA. When having received a message of "stored time is to be updated to acquired time" from the NAPT detecting unit 32, the identifier storage unit 33 updates the stored time (for example, 14:50:01) stored in the address information table to the acquired time (for example, 14:50:02), and also updates the stored ID (for example, "ID=4260") to the acquired ID (for example, "ID=30"). When having received a message of "stored ID is to be updated to acquired ID" and that "NAPT has been detected" from the NAPT detecting unit 32, the identifier storage unit 33 updates the stored ID (for example, "ID=4260") stored in the address-information storage unit 21 to the acquired ID (for example, "ID=30").

The monitoring-result output unit 34 outputs the monitoring result by the packet monitor. Specifically, the monitoring-result output unit 34 reads a monitoring result (for example, a monitoring result indicating that SA=C is an NAPT) from the monitoring-result storage unit 22 and outputs the monitoring result to the NMS via the output unit 12, after a predetermined time (for example, 10 minutes) has passed since reception of a monitoring request.

Process Performed by Packet Monitor According to First Embodiment

A process performed by the packet monitor 10 is explained next with reference to FIGS. 5 and 6. FIG. 5 is a flowchart of an entire process flow performed by the packet monitor according to the first embodiment when a monitoring request has been received, and FIG. 6 is a flowchart of a process flow performed by the packet monitor when a packet is received.

As illustrated in FIG. 5, upon reception of a monitoring request from the NMS via the input unit 11 (YES at Step S101), the packet-information acquiring unit 31 receives a transmission packet transmitted from an NAPT and a sending packet sent from a terminal device via the input unit 11, to acquire an SA and an ID added to the packet (Step S102).

Subsequently, the NAPT detecting unit 32 determines whether the ID has monotonically increased to detect the NAPT (Step S103). The identifier storage unit 33 stores or updates an SA, an ID, and a time (Step S104), and the monitoring-result output unit 34 determines whether a predetermined time has passed since reception of the monitoring request (Step S105).

When having determined that a predetermined time has not passed since reception of the monitoring request (NO at Step S105), the monitoring-result output unit 34 causes the packet-information acquiring unit 31 to acquire the SA and ID again to repeat the process (Steps S102 to S105) described above.

When having determined that a predetermined time has passed since the reception of the monitoring request (YES at Step S105), the monitoring-result output unit 34 reads the monitoring result from the monitoring-result storage unit 22, and outputs the monitoring result to the NMS via the output unit 12 (Step S106), to finish the process.

Further, as illustrated in FIG. 6, when having received a transmission packet transmitted from the NAPT and a sending packet sent from a terminal device via the input unit 11 (YES at Step S201), the packet-information acquiring unit 31 acquires the SA and ID added to the packet from the received transmission and sending packets (Step S202).

Subsequently, the NAPT detecting unit 32 searches for a record, in which a stored SA same as the acquired SA is stored, from the address information table (Step S203). When there is no stored SA same as an acquired SA in the address information table (NO at Step S203), the identifier storage unit 33 stores the acquired ID and an acquired time in the address information table in association with the acquired SA as a new SA (Step S204), and causes the packet-information acquiring unit 31 to wait for the transmission and sending packets again (Step S201).

When there is a record in which the stored SA same as the acquired SA is stored (YES at Step S203), the NAPT detecting unit 32 reads the stored time from the record in which the stored SA same as the acquired SA is stored, and determines whether the acquired time is within a predetermined time with respect to the stored time (Step S205). When the acquired time is not within a predetermined time with respect to the stored time (NO at Step S205), the identifier storage unit 33 updates the stored time stored in the address information table to the acquired time (Step S206), and updates the stored ID stored in the address information table to the acquired ID (Step S207) to cause the packet-information acquiring unit 31 to wait for the transmission packet and sending packet again (Step S201).

When the acquired time is within a predetermined time with respect to the stored time (YES at Step S205), the NAPT detecting unit 32 reads the stored ID from the record in which the stored SA same as the acquired SA is stored, calculates a difference by subtracting the stored ID from the acquired ID, and compares the difference with the reference ID, to determine whether a calculated difference is smaller than the reference ID (Step S208).

When the calculated difference is larger than the reference ID (NO at Step S208), the identifier storage unit 33 updates the stored ID stored in the address information table to the acquired ID (Step S207), and causes the packet-information acquiring unit 31 to wait for the transmission packet and sending packet again (Step S201).

When the calculated difference is smaller than the reference ID (YES at Step S208), the NAPT detecting unit 32 updates the presence of the NAPT in the same SA stored in the monitoring-result storage unit 22 (Step S209), and the identifier storage unit 33 updates the stored ID stored in the address information table to the acquired ID (Step S207) and causes the packet-information acquiring unit 31 to wait for the transmission packet and sending packet again (Step S201).

As described above, the packet monitor 10 monitors the packets transferred on the network (Steps S201 to S209) from the time at which the monitoring request is received until a predetermined time passes (Step S105).

Effects of First Embodiment

According to the first embodiment, an identifier acquired from a transmission packet transmitted from the NAPT is stored in a predetermined storage unit in association with a source address, and it is determined whether the number of the identifiers stored in a predetermined storage unit in association with each source address has monotonically increased. When it is determined that the identifier at a predetermined source address has not monotonically increased in the predetermined storage unit, the source indicated by a predetermined source address is detected as the address converting and transmitting device, thereby enabling to detect the source indicated by the predetermined source address as the NAPT. As a result, it is possible to cut and divide a fault location easily. That is, for example, when a fault location of communications in the network is estimated by using a packet loss rate, it is possible to determine that the source of the packet for which a packet loss has occurred is a terminal device connected via the NAPT, and thus to consider a possibility that a communication failure has occurred in the lower network.

According to the first embodiment, it is determined whether the identifier acquired from the transmission packet has decreased by a predetermined numerical value or more as compared with the identifier stored in the predetermined storage unit in association with each source address. When the ID corresponding to a predetermined source address has decreased, it is possible to detect the source indicated by the predetermined source address to be the NAPT, based on a fact that if the predetermined source address were to indicate one terminal device, the ID would not decrease.

Further, according to the first embodiment, when an information acquisition request from the network management system that manages the network is received, an identifier acquired from the transmission packet is stored in a predetermined storage unit in association with a source address. Therefore, it is possible to detect the source indicated by the predetermined source address to be the NAPT, when a fault location of communications in the network is estimated.

Figures 7A, 7B:
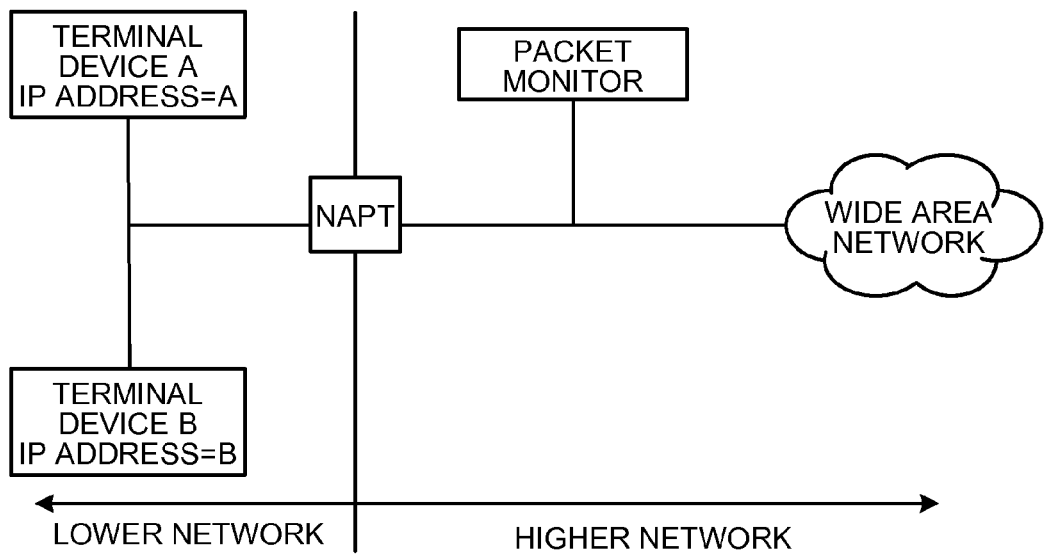
FIGS. 7A and 7B are schematic diagrams for explaining effects of the first embodiment.

In a specific example of estimating a fault location of communications in the network by using a packet loss rate, as illustrated in FIG. 7A, an NMS receives from a packet loss-rate calculator a calculation result of a packet loss rate in which a session ID (for example, S-1), a destination address (DA (for example, "E")), a destination port number (DP (for example, "P-1")), a source address (SA (for example, "C")), a source port number (SP (for example, "P-5")), a packet loss rate, and a monitoring start time of a packet to which a predetermined session ID is added are stored in association with each other. Here, it is assumed that the NMS receives a message, "a monitoring result of SA=C is NAPT", from the packet monitor 10. FIGS. 7A and 7B are schematic diagrams for explaining effects of the first embodiment. The session ID in this explanation indicates a unit of communications between predetermined terminal devices, and is specified by combination of DA, DP, SA, and SP.

Upon such an assumption, because packet loss rates calculated in association with "SA=C" are "0%", "4%", and "5%" and SA=C is an NAPT, it is understood that "S-2" and "S-3", in which a packet loss has occurred, are session IDs of packets provided by terminal devices connected to a lower network of the NAPT. That is, in the network illustrated in FIG. 7B, it is understood that a communication failure has occurred in the network at least via the NAPT. As a result, for estimating a fault location of communications in the network by using the packet loss rate, it is possible to consider a possibility that a communication failure has occurred in the lower network of the NAPT.

[b] Second Embodiment

In the first embodiment, an example in which a source indicated by a predetermined source address is detected as the NAPT has been explained. However, the present invention is not limited thereto, and for example, a source indicated by a predetermined source address may be detected as an NAPT, and then the number of terminal devices connected to a lower network of the NAPT may be counted. Therefore, a second embodiment of the present invention is explained with respect to an example in which a source indicated by a predetermined source address is detected as an NAPT, and then the number of terminal devices connected to a lower network of the NAPT is counted.

Outline and Features of Packet Monitor According to Second Embodiment

Figure 8:
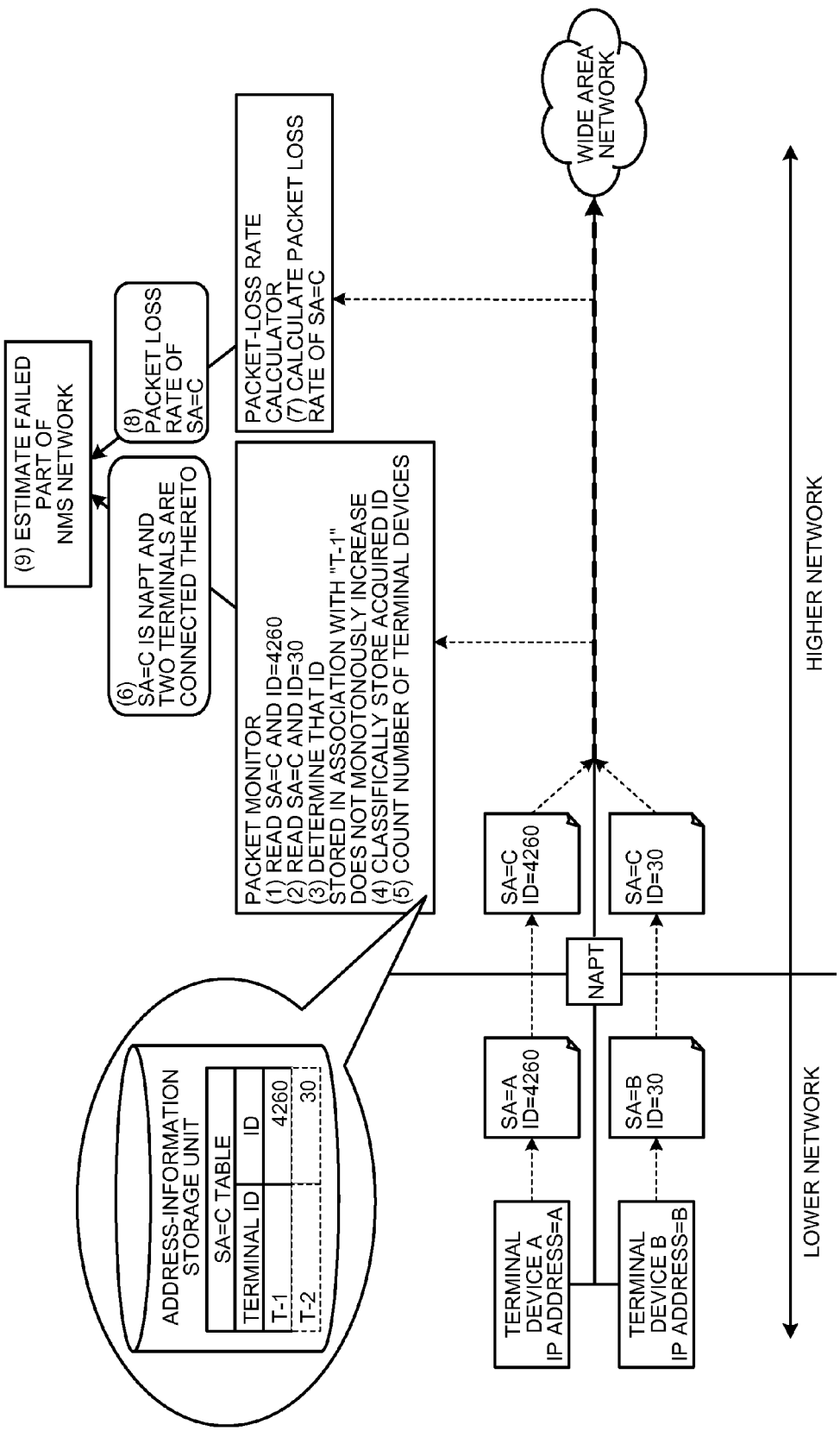
FIG. 8 is a schematic diagram for explaining an outline and features of a packet monitor according to a second embodiment of the present invention.

An outline and features of a packet monitor according to the second embodiment are explained first with reference to FIG. 8. FIG. 8 is a schematic diagram for explaining the outline and features of the packet monitor according to the second embodiment.

As illustrated in FIG. 8, the packet monitors according to the second embodiment has the same outline as that of the first embodiment, detects a source indicated by a predetermined source address as an NAPT, and is configured to count the number of terminal devices connected to a lower network of the NAPT. As a result, it is possible to cut and divide a fault location more easily.

In explaining the main features, the same assumptions as those for the first embodiment will be made for the second embodiment. The packet monitor according to the second embodiment stores an ID acquired from a transmission packet in an address-information storage unit in association with an SA. Specifically for example, as illustrated in (1) in FIG. 8, as in the packet monitor according to the first embodiment, upon reception of a monitoring request from an NMS, the packet monitor receives a transmission packet sent from a terminal device A and transmitted by the NAPT, and acquires "SA=C" and "ID=4260" from the transmission packet to store these pieces of information in the address-information storage unit. As illustrated in (2) in FIG. 8, the packet monitor receives a transmission packet sent from a terminal device B and transmitted by the NAPT to acquire "SA=C" and "ID=30".

The packet monitor respectively determines whether each ID stored in the address-information storage unit in association with the same SA has monotonically increased (see (3) in FIG. 8). Specifically for example, "SA=C table" is searched from a plurality of tables stored in the address-information storage unit for each SA, based on "SA=C" acquired from the transmission packet. The packet monitor reads "ID=4260" stored in the SA=C table in association with each terminal ID (for example, "T-1") arbitrarily provided in the SA=C table, and subtracts "ID=4260" from "ID=30" acquired from the transmission packet to calculate a difference "−4230". The packet monitor compares a calculated difference with a reference range (for example, "from −5 to 1000") for determining whether the ID specified by a user has monotonically increased, and determines that the calculated difference is not within the reference range.

When the calculated difference has not converged to a reference ID, the packet monitor classifically stores an ID acquired from the transmission packet (see (4) in FIG. 8). Specifically for example, when "SA=C" indicates one terminal device, an ID is generated by adding a numerical value every time a packet is sent. Therefore, an ID larger than "ID=4260" is supposed to be added to the next packet, which is "SA=C". Because a difference "−4230" calculated by subtracting "ID=4260" from "ID=30" actually acquired does not converge to the reference range "from −5 to 1000", the packet monitor determines that "ID=30" is added to a packet sent from another terminal device. The packet monitor then classifically stores an acquired ID as a terminal ID (for example, "T-2") different from the terminal ID stored in the address-information storage unit (for example, "T-1").

The packet monitor counts the number of divided and stored identifiers as the number of terminal devices connected to the NAPT (see (5) in FIG. 8). Specifically for example, the packet monitor counts the number of terminal IDs stored in the SA=C table as the number of terminal devices connected to the NAPT, and as illustrated at (6) in FIG. 8, outputs a message, "a monitoring result of SA=C is NAPT and two terminal devices are connected thereto", to the NMS.

Thereafter, as illustrated at (7) in FIG. 8, a packet loss-rate calculator calculates a packet loss rate of "SA=C", and as illustrated at (8) in FIG. 8, the packet loss rate of "SA=C" is output to the NMS. As illustrated at (9) in FIG. 8, the NMS estimates a failed part of the network by using "a monitoring result of SA=C is NAPT and two terminal devices are connected thereto" and the received packet loss rate of "SA=C" from the packet loss-rate calculator.

Thus, the packet monitor is configured to detect a source indicated by a predetermined source address as the NAPT, and to count the number of terminal devices connected to the lower network of the NAPT. As a result, it is possible to cut and divide the fault location more easily. That is, for example, when a fault location of communications in a network is estimated by using a packet loss rate, it is possible to determine that a source of a packet for which a packet loss has occurred is a terminal device connected via the NAPT, and to determine the number of terminal devices connected to the lower network of the NAPT. As a result, it is possible to guess a possibility that a communication failure has occurred in the lower network from the relation between the number of session IDs in which a packet loss has occurred, and the number of terminal devices.

Configuration of Packet Monitor According to Second Embodiment

A configuration of the packet monitor illustrated in FIG. 8 is explained with reference to FIG. 9. FIG. 9 is a block diagram of the configuration of the packet monitor according to the second embodiment. The packet monitor according to the second embodiment operates in the same manner as in the packet monitor 10 illustrated in FIG. 2, except the address-information storage unit 21, the monitoring-result storage unit 22, the NAPT detecting unit 32, the monitoring-result output unit 34, an identifier-classification storage unit 35, and a terminal-device counting unit 36, and thus only a feature different from the packet monitor 10 according to the first embodiment is explained in detail.

The address-information storage unit 21 stores information acquired from a transmission packet. Specifically for example, as illustrated in FIG. 10A, the address-information storage unit 21 stores an address information table as in the first embodiment. As illustrated in FIG. 10B, the address-information storage unit 21 stores an ID (for example, "4260") and a time (for example, 14:50:01) at which an ID and an SA are acquired from the transmission packet, in association with an arbitrarily provided terminal ID (for example, "T-1") as a plurality of tables stored for each SA (for example, SA=C table (hereinafter, table concerning an SA same as an acquired SA is expressed as "same SA table")). FIGS. 10A and 10B are examples of information stored in the address-information storage unit according to the second embodiment.

The monitoring-result storage unit 22 stores a monitoring result acquired by the packet monitor. Specifically for example, as illustrated in FIG. 11, the monitoring-result storage unit 22 stores the presence of an NAPT (for example, "YES" or "NO") and the number of terminals (for example, SA (for example, "2") in association with an SA (for example, "C") as a monitoring result. FIG. 11 is an example of information stored in the monitoring-result storage unit according to the second embodiment.

The NAPT detecting unit 32 performs respective processes as in the first embodiment. To explain with a specific example, upon reception of an acquired SA (for example, "SA=C"), an acquired ID (for example, "ID=30"), and an acquired time (for example, 14:50:02) from the packet-information acquiring unit 31, the NAPT detecting unit 32 searches for a record, in which a stored SA same as the acquired SA is stored, from the address information table. When there is no stored SA same as the acquired SA in the address information table, the NAPT detecting unit 32 informs the identifier-classification storage unit 35 that "new record is to be generated". When there is the stored SA same as the acquired SA, the NAPT detecting unit 32 reads a stored time (for example, 14:50:01) from the record in which the stored SA same as the acquired SA is stored, to determine whether the acquired time is longer than the stored time by a predetermined time (for example, 1 second).

When the acquired time is longer than the stored time in the address information table by a predetermined time, the NAPT detecting unit 32 informs the identifier-classification storage unit 35 that "same SA table is deleted". When the acquired time is within a predetermined time with respect to the stored time, the NAPT detecting unit 32 reads the stored ID from the record, in which the stored SA same as the acquired SA is stored, in the address information table, and subtracts the stored ID (for example, ID=4260") from the acquired ID (for example, "ID=30") to calculate a difference (for example, "−4230"). The NAPT detecting unit 32 compares the difference with a reference range (for example, "from −5 to 1000") for determining whether the ID specified by the user has monotonically increased, to determine whether a calculated difference is within the reference range. When the calculated difference is within the reference range, the NAPT detecting unit 32 informs the identifier-classification storage unit 35 that "stored ID is to be updated to acquired ID". When the calculated difference is not within the reference range, the NAPT detecting unit 32 updates the presence of the NAPT in the same SA stored in the monitoring-result storage unit 22 from "NO" to "YES", and informs the identifier-classification storage unit 35 that "detection of NAPT has finished".

The identifier-classification storage unit 35 stores the ID acquired from the packet transferred on the network in a predetermined storage unit in association with the SA. When the ID is away from all IDs corresponding to the same SA stored in the predetermined storage unit by a predetermined degree or more, the identifier-classification storage unit 35 classifically stores the ID acquired from the transmission packet. When the ID approximates to a predetermined ID corresponding to the same SA stored in the predetermined storage unit by a predetermined degree or more, the identifier-classification storage unit 35 stores the identifier acquired from the transmission packet to be overwritten on a predetermined ID.

Specifically for example, the identifier-classification storage unit 35 receives an acquired SA, an acquired ID, and an acquired time from the packet-information acquiring unit 31. When having received a message of "a new record is to be generated" from the NAPT detecting unit 32, the identifier-classification storage unit 35 stores an acquired ID (for example "4260") and an acquired time (for example, 14:50:01) in the address information table in association with the acquired SA (for example, "C") as a new SA, to generate the same SA table, and stores the acquired ID and the acquired time in association with a new terminal ID (for example, "T-1"). When having received a message of "same SA table is deleted" from the NAPT detecting unit 32, the identifier-classification storage unit 35 deletes the same SA table, updates the stored time (for example, 14:50:01) stored in the address information table to the acquired time (for example, 14:50:02), and also updates the stored ID (for example, "ID=4260") to the acquired ID (for example, "ID=30"). When having received a message of "stored ID is to be updated to acquired ID" from the NAPT detecting unit 32, the identifier-classification storage unit 35 updates the stored time stored in the address information table to the acquired time and updates the stored ID (for example, "ID=4260") to the acquired ID (for example, "ID=30").

When having received a message of "detection of NAPT has finished" from the NAPT detecting unit 32, the identifier-classification storage unit 35 reads a stored time (for example, 14:50:01) corresponding to each terminal ID from the same SA table, to determine whether the acquired time is longer than each stored time by a predetermined time (for example, 1 second), and deletes a record concerning the terminal ID for which the acquired time is longer than each stored time by the predetermined time. The identifier-classification storage unit 35 reads the stored ID corresponding to each terminal ID from the same SA table, and subtracts the stored ID (for example, ID=4260") corresponding to each terminal ID from the acquired ID (for example, "ID=30") to calculate a terminal ID difference (for example, "−4230") corresponding to each terminal ID. The identifier-classification storage unit 35 compares the terminal ID difference with the reference range (for example, "from −5 to 1000") for determining whether the ID specified by the user has monotonically increased, to determine whether a calculated difference of the terminal ID is within the reference range.

When all the terminal ID differences are not within the reference range, the identifier-classification storage unit 35 stores an acquired ID and an acquired time as a new terminal ID in the same SA table (for example, "T-2"), updates a stored time (for example, 14:50:01) stored in the address information table to the acquired time (for example, 14:50:02), and updates the stored ID (for example, "ID=4260") to the acquired ID (for example, "ID=30"). When all the terminal ID differences are within a reference range with respect to a predetermined terminal ID, the identifier-classification storage unit 35 updates the stored ID corresponding to the predetermined terminal ID stored in the same SA table to the acquired ID, the stored time corresponding to the predetermined terminal ID to the acquired time, and the stored ID stored in the address information table to the acquired ID and the stored time to the acquired time. The identifier-classification storage unit 35 corresponds to "identifier storage unit", "identifier determining unit", and "identifier-classification storage unit" described in the claims.

The terminal-device counting unit 36 counts the number of terminal devices. Specifically, the terminal-device counting unit 36 reads the terminal ID from a plurality of tables (for example, SA=C table) stored for each SA, to count the number of terminal IDs in each SA. The terminal-device counting unit 36 then stores the counted number of terminal IDs (for example, "2") in the monitoring-result storage unit 22 as the number of terminals in association with the SA (for example, SA=C). The terminal-device counting unit 36 corresponds to "terminal-device counting unit" described in the claims.

The monitoring-result output unit 34 outputs a monitoring result acquired by the packet monitor. Specifically, the monitoring-result output unit 34 reads the monitoring result (for example, the SA=C is the NAPT, and the number of terminals is "2") from the monitoring-result storage unit 22 after a predetermined time (for example, 10 minutes) has passed since the reception of the monitoring request, and outputs the monitoring result to the NMS via the output unit 12.

Process Performed by Packet Monitor According to Second Embodiment

Figure 12:
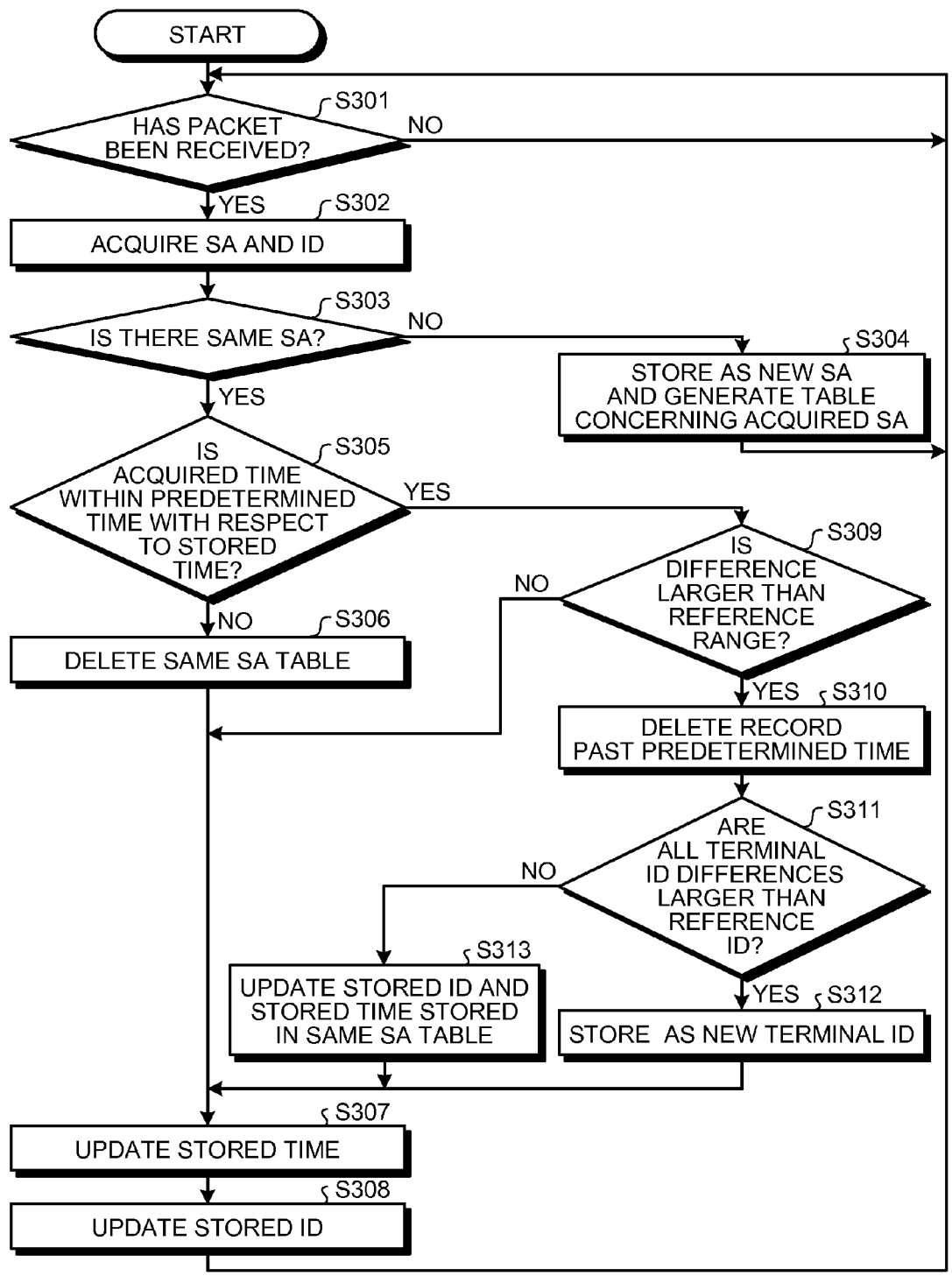
FIG. 12 is a flowchart of a process flow performed by the packet monitor according to the second embodiment when a packet is received.

A process performed by the packet monitor 10 is explained next with reference to FIG. 12. FIG. 12 is a flowchart of a process flow performed by the packet monitor according to the second embodiment when a packet is received. An entire process flow performed by the packet monitor when a packet is received according to the second embodiment is the same as the process flow in the first embodiment, except that when it is determined that a predetermined time has passed since reception of the monitoring request (YES at Step S105), the terminal-device counting unit 36 counts the number of terminal devices and outputs the monitoring result to the NMS via the output unit 12 (Step S106).

As illustrated in FIG. 12, upon reception of the transmission packet and the sending packet via the input unit 11 (YES at Step S301), the packet-information acquiring unit 31 acquires an SA and an ID added to the received transmission packet and sending packet (Step S302).

Subsequently, the NAPT detecting unit 32 searches for a record, in which a stored SA same as the acquired SA is stored, from the address information table (Step S303). When there is no stored SA same as the acquired SA (NO at Step S303), the identifier-classification storage unit 35 stores an acquired ID and an acquired time in the address information table in association with the acquired SA as a new SA to generate an SA table (Step S304), and causes the packet-information acquiring unit 31 to wait for the transmission and sending packets again (Step S301).

When there is the stored SA same as the acquired SA (YES at Step S303), a stored time is read from the record in which the stored SA same as the acquired SA is stored, to determine whether the acquired time is within a predetermined time with respect to the stored time (Step S305). When the acquired time is not within a predetermined time with respect to the stored time (NO at Step S305), the same SA table (Step S306) is deleted, the stored time stored in the address information table is updated to the acquired time (Step S307), the stored ID stored in the address information table is updated to the acquired ID (Step S308), and the packet-information acquiring unit 31 is caused to wait for the transmission packet and sending packet again (Step S301).

When the acquired time is within a predetermined time with respect to the stored time (YES at Step S305), the NAPT detecting unit 32 reads the stored ID from the record, in which the stored SA same as the acquired SA is stored, in the address information table, subtracts the stored ID from the acquired ID to calculate a difference, and compares the difference with the reference range, to determine whether the difference is larger than the reference range (Step S309).

When a calculated difference is not larger than the reference range (NO at Step S309), the identifier-classification storage unit 35 updates the stored time stored in the address information table to the acquired time (Step S307), updates the stored ID stored in the address information table to the acquired ID (Step S308), and causes the packet-information acquiring unit 31 to wait for the transmission packet and sending packet again (Step S301).

When the calculated difference is larger than the reference range (YES at Step S309), the NAPT detecting unit 32 updates the presence of the NAPT in the same SA stored in the monitoring-result storage unit 22, and the identifier-classification storage unit 35 deletes a record in which the acquired time stored in the same SA table is longer than the stored time by a predetermined time (Step S310), reads the stored ID corresponding to each terminal ID from the same SA table, calculates each terminal ID difference by subtracting the stored ID from the acquired ID, and compares the difference with the reference range to determine whether the calculated terminal ID difference is larger than the reference ID (Step S311).

When all the terminal ID differences are larger than the reference range (YES at Step S311), the identifier-classification storage unit 35 stores it in the same SA table as a new terminal ID (Step S312), updates the stored time stored in the address information table to the acquired time (Step S307), and updates the stored ID stored in the address-information storage unit 21 to the acquired ID (Step S308), to cause the packet-information acquiring unit 31 to wait for the transmission packet and sending packet again (Step S301).

When the terminal ID difference is within the reference range (NO at Step S311), the identifier-classification storage unit 35 updates the predetermined stored ID stored in the same SA table to the acquired ID and the stored time corresponding to the predetermined stored ID to the acquired time (Step S313), and updates the stored time stored in the address information table to the acquired time (Step S307) and the stored ID stored in the same SA time to the acquired ID (Step S308), to cause the packet-information acquiring unit 31 to wait for the transmission packet and sending packet again (Step S301).

Thus, the packet monitor 10 according to the second embodiment monitors packets transferred on the network (Steps S301 to S313) from a time at which a monitoring request is received until a predetermined time passes (Step S105).

Effects of Second Embodiment

According to the second embodiment, when an identifier is deviates from all identifiers corresponding to the same source address stored in a predetermined storage unit by a predetermined degree or more, the identifier acquired from the transmission packet is classifically stored. When the identifier is approximate to a predetermined identifier corresponding to the same source address stored in the predetermined storage unit by a predetermined degree or more, the identifier acquired from the transmission packet is stored to overwrite a predetermined identifier. The number of identifiers classifically stored is counted as the number of terminal devices connected to the address converting and transmitting device. Therefore, after the source indicated by a predetermined source address is detected to be an NAPT, it is possible to count the number of terminal devices connected to a lower network of the NAPT. As a result, it is possible to cut and divide a fault location easily. That is, at the time of estimating a fault location of communications in a network by using a packet loss rate, it is possible to determine the number of terminal devices connected to the lower network of the NAPT. Therefore, it is possible to guess a high possibility that a communication failure has occurred in the lower network from the relation between the number of session IDs in which a packet loss has occurred, and the number of terminal devices.

According to the second embodiment, it is determined whether the identifier acquired from the transmission packet has increased by a predetermined number or more as compared with the identifier stored in a predetermined storage unit in association with each source address. Therefore, it is possible to detect the source indicated by the predetermined source address to be an NAPT when the ID corresponding to the predetermined source address has increased abruptly, based on a fact that an ID would not increase abruptly if the predetermined source address were to indicate one terminal device.

In a specific example of estimating a fault location of communications in a network by using a packet loss rate, as illustrated in FIG. 13A, it is assumed that an NMS receives a calculation result of the packet loss rate as in the first embodiment, and receives "a monitoring result of SA=C is NAPT and the number of terminal devices is two" from the packet monitor 10. Thereafter, as illustrated in FIG. 13B, the NMS receives a calculation result of the packet loss rate again from the packet loss calculator. The NMS then receives "a monitoring result of SA=C is NAPT and the number of terminal devices is one" from the packet monitor 10. FIGS. 13A and 13B are tables for explaining effects of the second embodiment.

Upon such an assumption, because the packet loss rates calculated in association with "SA=C" are "0%", "4%", and "5%" when the number of terminals is "2", and "0%" when the number of terminals is "1", it is understood that "S-2" and "S-3" in which a packet loss has occurred are session IDs in the packet provided by a single terminal device connected to the lower network of the NAPT. It is possible to estimate that there is no packet loss in packet sending provided by another terminal device connected to the lower network. That is, in the network illustrated in FIG. 7B, it is possible to determine that a communication failure has occurred in the network via the NAPT to which at least two terminal devices are connected, and to estimate that a communication failure has occurred in a single terminal device. As a result, when a fault location of communications in the network is estimated by using the packet loss rate, it is possible to estimate a high possibility that a communication failure has occurred in the lower network.

[c] Third Embodiment

In the second embodiment, an example in which the number of terminal devices connected to a lower network of an NAPT is counted after a source indicated by a predetermined source address is detected as the NAPT has been explained. However, the present invention is not limited thereto, and after the source indicated by the predetermined source address is detected as the NAPT, a session ID corresponding to an arbitrarily provided terminal ID may be detected. Therefore, as a third embodiment of the present invention, an example in which a session ID corresponding to an arbitrarily provided terminal ID is detected after a source indicated by a predetermined source address is detected as an NAPT is explained.

Outline and Features of Packet Monitor According to Third Embodiment

An outline and features of a packet monitor according to the third embodiment are explained first. The packet monitor according to the third embodiment detects a source indicated by a predetermined source address as an NAPT, and is configured to detect a session ID corresponding to an arbitrarily provided terminal ID with the same outline as the second embodiment. As a result, it is possible to cut and divide a fault location easily.

Substantially similar assumptions and features as those in the second embodiment apply to the third embodiment, and only those features different from the second embodiment will be explained in detail.

When sending one file as a single packet or plural packets to the same terminal device (even when the port number is different, it is included in the same terminal device), a terminal device A connected to a lower network of a NAPT sends the single packet or the plural transmission packets by adding "SA=A", "ID=4260", and the session ID (for example, "S-1" (hereinafter, "ID=4260" corresponding to "S-1" is expressed as "S-1-4260")) thereto. When the packet is transmitted from the lower network to a higher network by the NAPT, a session ID (for example, "S-1") added to the sending packet sent by the terminal device A is held.

When sending one file as a single packet or plural packets to the same terminal device, a terminal device B connected to the lower network of the NAPT sends the single packet or the plural transmission packets by adding "SA=B", "ID=30", and "S-2" thereto. When sending the next file as a single transmission packet or plural transmission packets to another terminal device, the terminal device B sends the packets by adding "SA=B", "ID=31", and "S-3" thereto.

Upon such an assumption, when the ID deviates from all IDs corresponding to the same SA stored in a predetermined storage unit by a predetermined degree or more, the packet monitor according to the third embodiment classifically stores the session ID and the ID acquired from the transmission packet together in the predetermined storage unit. Specifically for example, because the ID is generated by adding a numerical value every time a packet is sent, when different session IDs (for example, "S-1" and "S-2") are added by the same terminal device, an ID larger than "S-1-4260" is supposed to be added to a packet added with "S-2". Because a difference "−4230" calculated by subtracting "S-1-4260" from "S-2-30" actually acquired is smaller than the reference ID "−5", the packet monitor determines that "S-2" is the session ID added to the packet sent from another terminal device, and classifically stores "S-2" as a terminal ID (for example, "T-2") different from "S-1" in the address-information storage unit.

The packet monitor according to the third embodiment refers to the address-information storage unit, and outputs a message, for example, "a monitoring result of SA=C is NAPT, and "S-1" and "S-2" are session IDs provided by different terminal devices" to an NMS.

A packet loss-rate calculator then calculates the packet loss rates of "S-1" and "S-2", and outputs the packet loss rates of "S-1" and "S-2" to the NMS. The NMS estimates a fault location of the network by using the "a monitoring result of SA=C is NAPT, and "S-1" and "S-2" are session IDs provided by different terminal devices" from the packet monitor, and the received packet loss rates of "S-1" and "S-2" from the packet loss-rate calculator.

Thus, the packet monitor is configured to detect the source indicated by a predetermined source address as the NAPT, to detect the session ID corresponding to the terminal ID arbitrarily provided. As a result, it is possible to cut and divide the fault location more specifically. That is, for example, when a fault location of communications in the network is estimated by using the packet loss rate, it is possible to determine that the session ID, in which a packet loss has occurred, is the session ID provided by the terminal device connected via the NAPT. It is possible to specify the terminal device corresponding to the session ID, in which a packet loss has occurred, by associating the terminal ID arbitrarily provided with the session ID in which the packet loss has occurred, and it can be estimated that a communication failure has occurred between the NAPT and the terminal device, that is, on the lower network side in the terminal device, in which packet losses have frequently occurred in the same session ID.

Configuration of Packet Monitor According to Third Embodiment

A configuration of the packet monitor according to the third embodiment is explained next. The packet monitor according to the third embodiment has the same configuration as that of the packet monitor 10 illustrated in FIG. 9, except the monitoring-result storage unit 22 and the terminal-device counting unit 36. Further, the packet monitor according to the third embodiment operates in the same manner as in the packet monitor 10 illustrated in FIG. 9, except the address-information storage unit 21, the packet-information acquiring unit 31, the NAPT detecting unit 32, the monitoring-result output unit 34, and the identifier-classification storage unit 35. Only a feature different from the packet monitor 10 according to the second embodiment is explained below in detail.

The address-information storage unit 21 stores information acquired from the transmission packet. Specifically for example, as illustrated in FIG. 14A, the address-information storage unit 21 stores the address information table as in the first and second embodiments. As illustrated in FIG. 14B, the address-information storage unit 21 stores a session ID (for example, "S-1") and an ID (for example, "4260") as a plurality of tables (for example, SA=C table) stored for each SA, and a former session ID (for example, "fS-1") as the session ID added to a packet acquired at the time of storing the ID and a deleted session ID (for example, "dS-2") as a session ID stored in association with a predetermined terminal ID and deleted from a record concerning a predetermined terminal ID, in association with an arbitrarily provided terminal ID (for example, "T-1"). As illustrated in FIG. 14C, the address-information storage unit 21 stores a terminal ID (for example, "T-1") and a start time (for example, 14:50:01) as a time when a packet added with the predetermined session ID was received first in association with a session ID, as a session ID table (for example, a session table C), which is a plurality of tables stored for each SA (hereinafter, session ID table concerning an SA same as the acquired SA is expressed as "same SA session table"). FIGS. 14A to 14C are examples of information stored in the address-information storage unit according to the third embodiment. For example, it is assumed that "fS-1" or "dS-1" are session IDs same as "S-1".

The packet-information acquiring unit 31 acquires predetermined information from a packet transferred on the network. Specifically, upon reception of a monitoring request from the NMS via the input unit 11, the packet-information acquiring unit 31 acquires the SA, ID, and session ID added to the packet from the received transmission packet and sending packet. The packet-information acquiring unit 31 sends an SA, an ID, a session ID, and a time at which the information has been acquired to the NAPT detecting unit 32 and the identifier-classification storage unit 35. The session ID actually acquired by the packet-information acquiring unit 31 is expressed as "acquired session ID" where appropriate.

The NAPT detecting unit 32 performs respective processes as in the second embodiment. Specifically for example, upon reception of an acquired SA, an acquired ID, and an acquired time from the packet-information acquiring unit 31, the NAPT detecting unit 32 searches for a stored SA same as the acquired SA from the address information table. When there is the stored SA same as the acquired SA, the NAPT detecting unit 32 searches for a record, in which a session ID same as the acquired session ID is stored, from the address information table. When there is no same session ID, the NAPT detecting unit 32 informs the identifier-classification storage unit 35 that "a new record is to be generated". When there is the same session ID, the NAPT detecting unit 32 searches for a session ID same as the acquired session ID (for example, "S-1") from the same SA session table (for example, session table C). When there is no session ID same as the acquired session ID in the same SA session table, the NAPT detecting unit 32 informs the identifier-classification storage unit 35 that "a record concerning the acquired session ID is to be generated".

When there is a session ID same as the acquired session ID in the same SA session table, the NAPT detecting unit 32 determines whether the acquired session ID is the same as the former session ID (for example, "fS-1") stored in the same SA table. When the acquired session ID is the same as the former session ID, the NAPT detecting unit 32 informs the identifier-classification storage unit 35 that "ID concerning acquired session ID is to be updated".

When the acquired session ID is not the same as the former session ID, the NAPT detecting unit 32 reads the stored ID corresponding to the acquired session ID from the same SA table, and subtracts the stored ID (for example, "ID=10000") from the acquired ID (for example, "ID=4260") to calculate a difference (for example, "ID=−5740"). The NAPT detecting unit 32 compares the difference with the reference ID (for example, "−5") for determining whether the ID specified by the user has monotonically increased, to determine whether a calculated difference is smaller than the reference ID. When the calculated difference is larger than the reference ID, the NAPT detecting unit 32 informs an identifier-classification storage unit 35a that "the ID concerning the acquired session ID and the former session are to be updated".

When the calculated difference is smaller than the reference ID, the NAPT detecting unit 32 reads the terminal ID corresponding to the acquired session ID from the same SA session table, refers to a start time stored in each record storing the same terminal ID to search for the session ID with the latest start time, and sends the searched session ID as "a session ID to be deleted" indicating the session ID, which is to be deleted, to the identifier-classification storage unit 35.

When the ID deviates from the respective IDs corresponding to the same SA stored in a predetermined storage unit by a predetermined degree or more, the identifier-classification storage unit 35 classifically stores the session ID and the ID acquired from the transmission packet together in a predetermined storage unit. Specifically for example, the identifier-classification storage unit 35 receives an acquired SA, an acquired ID, a session ID, and an acquired time from the packet-information acquiring unit 31. When having received the message, "a new record is to be generated", from the NAPT detecting unit 32, the identifier-classification storage unit 35 stores the acquired ID in the address information table in association with the acquired SA as a new record, to generate an SA table concerning the acquired SA. The identifier-classification storage unit 35 stores the new session ID (for example, "T-1"), acquired ID (for example, "ID=4260"), and the former session (for example, "fS-1") in the same SA table in association with a new terminal ID (for example, "T-1"). The identifier-classification storage unit 35 generates an SA session table concerning the acquired SA, and stores the new terminal ID and the start time (for example, 14:50:01) therein in association with the new session ID.

When having received a message, "a record concerning the acquired session ID is to be generated" from the NAPT detecting unit 32, the identifier-classification storage unit 35 stores the acquired session ID in the same SA table in association with the existing terminal ID (for example, "T-1") to update the stored ID (for example, "ID=4260") corresponding to the existing terminal ID to the acquired ID (for example, "ID=4261"). The identifier-classification storage unit 35 then updates the former session (for example, "fS-1") to the acquired session ID (for example, "fS-2"), and stores the terminal ID (for example, "T-1") corresponding to the acquired session ID and the start time (for example, 14:50:01) in the same SA session table in association with the session ID as a new record.

When having received a message, "an ID concerning the acquired session ID is to be updated", from the NAPT detecting unit 32, the identifier-classification storage unit 35 updates the stored ID (for example, "ID=4260") stored in the same SA table to the acquired ID (for example, "ID=4261"). When having received a message of "the ID concerning the acquired session ID and the former session are to be updated" from the NAPT detecting unit 32, the identifier-classification storage unit 35 updates the former session ID (for example, "fS-1") stored in the same SA table to the acquired session ID (for example, "fS-2") and the stored ID to the acquired ID.

Upon reception of the session ID to be deleted from the NAPT detecting unit 32, the identifier-classification storage unit 35 deletes the session ID to be deleted (for example, "S-4") from the same SA table, stores the deleted session ID (for example, "dS-4") in the deleted record, updates the stored ID (for example, "ID=10000") corresponding to the deleted record to the acquired ID (for example, "ID=4263") and the former session ID (for example, "fS-4") corresponding to the deleted record to the acquired session ID (for example, "fS-1"), and searches for an deleted session ID (for example, "dS-4") same as the session ID to be deleted (for example, "S-4") from the same SA table (for example, SA=C table").

When there is a deleted session ID same as the session ID to be deleted in all terminal IDs in the same SA table, the identifier-classification storage unit 35 stores the session ID to be deleted (for example, "S-4"), the acquired ID (for example, "ID=10000") concerning the session ID to be deleted, and the former session ID (for example, "fS-4"), which is the session ID to be deleted in the same SA table (for example, SA=C table), in association with a new terminal ID (for example, "T-3"), and updates the terminal ID corresponding to the session ID to be deleted stored in the same SA session table to the new terminal ID.

When there is no deleted session ID same as the session ID to be deleted in a predetermined terminal ID in the same SA table, the identifier-classification storage unit 35 stores the session ID to be deleted (for example, "S-4") in the same SA table (for example, SA=C table) in association with a predetermined terminal ID (for example, "T-2"). The identifier-classification storage unit 35 then updates the stored ID (for example, "ID=32") corresponding to the predetermined terminal ID (for example, "T-2") to the acquired ID (for example, "ID=10000") concerning the session ID to be deleted, the former session ID (for example, "fS-3") to the session ID to be deleted (for example, "fS-4"), and the terminal ID (for example, "T-1") corresponding to the session ID to be deleted (for example, "fS-4") stored in the same SA session table to the predetermined terminal ID (for example, "T-2").

The monitoring-result output unit 34 outputs a monitoring result acquired by the packet monitor. Specifically, the monitoring-result output unit 34 reads the monitoring result (for example, SA=C is NAPT, and "S-1" and "S-2" are session IDs added by different terminal devices) from the address-information storage unit 21 after a predetermined time (for example, 10 minutes) has passed since the reception of the monitoring request, and outputs the monitoring result to the NMS via the output unit 12.

Process Performed by Packet Monitor According to Third Embodiment

Figure 15:
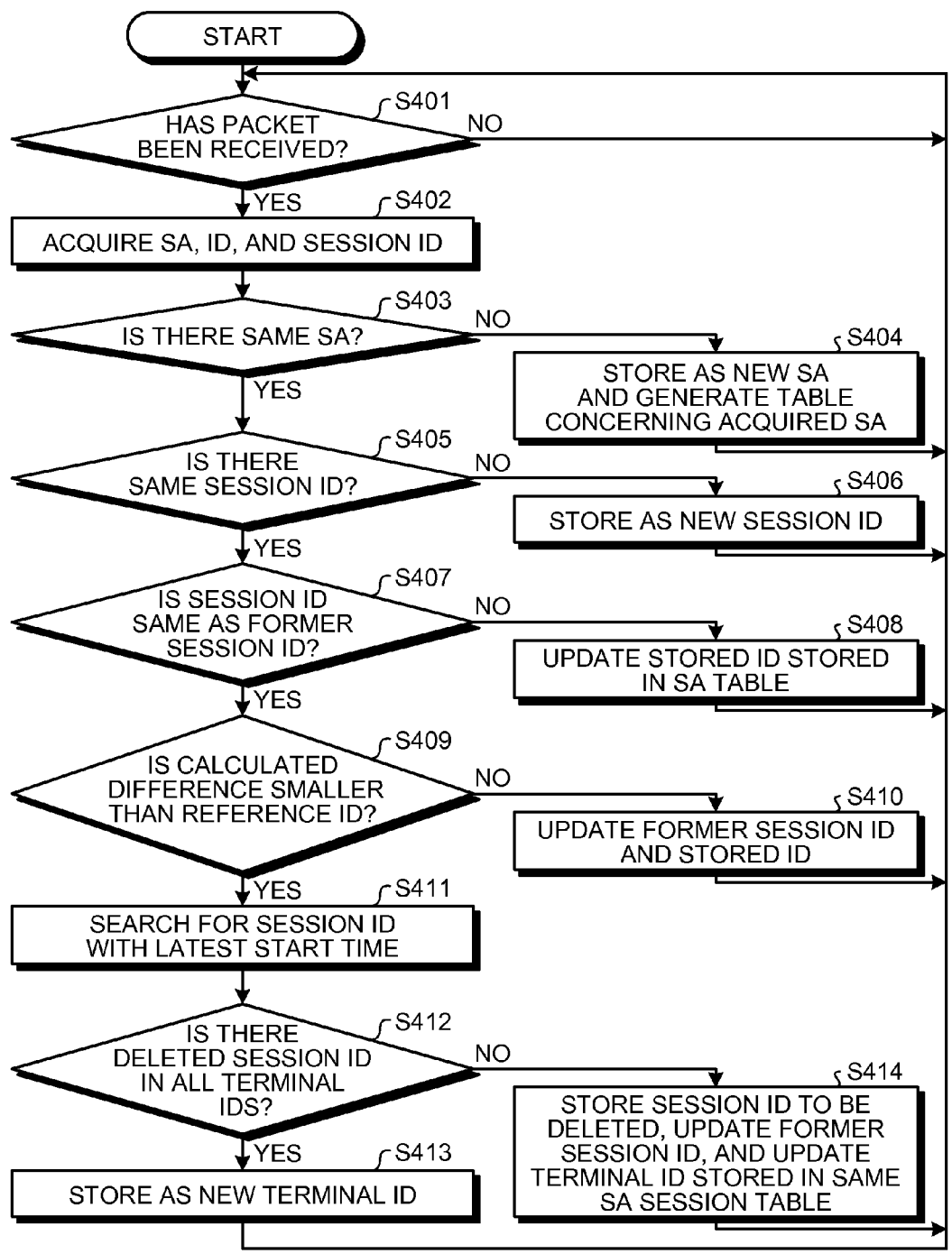
FIG. 15 is a flowchart of a process flow performed by a packet monitor according to the third embodiment when a packet is received.

A process performed by the packet monitor 10 is explained next with reference to FIG. 15. FIG. 15 is a flowchart of a process flow performed by the packet monitor when a packet is received according to the third embodiment. The entire process flow performed by the packet monitor when a packet is received according to the third embodiment is the same as the process flow in the first embodiment, except that the packet-information acquiring unit 31 receives the transmission packet and the sending packet via the input unit 11, to acquire an SA, an ID, and a session ID added to the packets (Step S102), and the identifier-classification storage unit 35 classifically stores or updates the SA, the ID, the session ID, and a start time (Step S104).

As illustrated in FIG. 15, upon reception of the transmission packet and sending packet transmitted via the input unit 11 (YES at Step S401), the packet-information acquiring unit 31 acquires the SA, ID, and session ID added to the packets from the received transmission packet and sending packet (Step S402).

Subsequently, the NAPT detecting unit 32 searches for a stored SA same as the acquired SA from the address information table (Step S403). When there the same stored SA is not found (NO at Step S403), the NAPT detecting unit 32 stores the acquired SA as a new SA in the address information table to generate a table concerning the acquired SA and generates a session table concerning the acquired SA (Step S404), and causes the packet-information acquiring unit 31 to wait for the transmission packet and sending packet again (Step S401).

When there is a record in which the same stored SA is stored (YES at Step S403), the NAPT detecting unit 32 searches for a session ID same as the acquired session ID from the same SA session table (Step S405). When there is no same session ID (NO at Step S405), the NAPT detecting unit 32 stores the session ID in the SA table to update the stored ID to the acquired ID, and also stores the terminal ID and the start time in the session table as a new session ID (Step S406), to cause the packet-information acquiring unit 31 to wait for the transmission packet and sending packet again (Step S401).

When there is a same session ID (YES at Step S405), the NAPT detecting unit 32 determines whether the session ID is the same as the former session ID (Step S407). When the session ID is the same as the former session ID (NO at Step S407), the NAPT detecting unit 32 updates the stored ID stored in the SA table to the acquired ID (Step S408), and causes the packet-information acquiring unit 31 to wait for the transmission packet and sending packet again (Step S401).

When the session ID is not the same as the former session ID (NO at Step S407), the NAPT detecting unit 32 reads the stored ID in the terminal ID searched from the same SA table, to calculate a difference by subtracting the stored ID from the acquired ID. The NAPT detecting unit 32 then compares the difference with the reference ID specified by a user and determines whether a calculated difference is smaller than the reference ID (Step S409). When the calculated difference is larger than the reference ID (NO at Step S409), the NAPT detecting unit 32 updates the former session ID stored in the SA table to the acquired session ID and the stored ID to the acquired ID (Step S410), to cause the packet-information acquiring unit 31 to wait for the transmission packet and sending packet again (Step S401).

When the calculated difference is smaller than the reference ID (YES at Step S409), the NAPT detecting unit 32 reads the terminal ID stored in the record in which the acquired session ID is stored from the same SA session table, and refers to the start time stored in each record storing the same terminal ID to search for a session ID having the latest start time (Step S411).

Subsequently, the identifier-classification storage unit 35 deletes the session ID to be deleted from the same SA table, stores the deleted session ID in the deleted record, and updates the stored ID corresponding to the deleted record to the acquired ID and the former session ID corresponding to the deleted record to the acquired session ID. The identifier-classification storage unit 35 then searches for a deleted session ID same as the deleted session ID from the same SA table (Step S412). When there is a deleted session ID same as the session ID to be deleted in all terminal IDs in the same SA table (YES at Step S412), the identifier-classification storage unit 35 stores the session ID to be deleted, the acquired ID concerning the session ID to be deleted, and the former session ID, which is the session ID to be deleted, in the same SA table in association with the new terminal ID, and updates the terminal ID corresponding to the session ID to be deleted stored in the same SA session table to the new terminal ID (Step S413), to cause the packet-information acquiring unit 31 to wait for the transmission packet and sending packet again (Step S401).

When there is no deleted session ID same as the session ID to be deleted in a predetermined terminal ID in the same SA table (NO at Step S412), the identifier-classification storage unit 35 stores the session ID to be deleted in the same SA table in association with the predetermined terminal ID, and updates the former session ID to the session ID to be deleted and the terminal ID corresponding to the session ID to be deleted stored in the same SA session table to the predetermined terminal ID (Step S414) to cause the packet-information acquiring unit 31 to wait for the transmission packet and sending packet again (Step S401).

Thus, the packet monitor 10 according to the third embodiment monitors the packets transferred on the network (Steps S401 to S414) from the time the monitoring request is received until a predetermined time passes (Step S105).

An example of a process performed by the packet monitor is explained with reference to FIG. 16. FIG. 16 depicts tables for explaining an example of the process performed by the packet monitor according to the third embodiment. For explaining the example of the process performed by the packet monitor, as illustrated at (A) in FIG. 16, it is assumed that "SA=C" is provided to all packets, and packets added with "S-1-4260" at a time "14:50:01", "S-2-30" at a time "14:50:02", "S-3-31" at a time "14:50:03", "S-1-4261" at a time "14:50:04", and "S-1-4262" at a time "14:50:04" are received sequentially. Upon such an assumption, an example in which packets added with "S-4-10000" at a time "14:50:05", "S-1-4263" at a time "14:50:06", and "S-2-32" at a time "14:50:07" are sequentially received is explained. In FIG. 16, the address-information storage unit 21 illustrated in FIGS. 14A and 14C is illustrated in a simplified manner.

As illustrated in (A) in FIG. 16, "S-1", "ID=4262", "fS-1", and "dS-2, dS-3" are stored in the SA=C table in association with terminal ID "T-1", and "S-2, S-3", "ID=31", "fS-3", and "dS-2, dS-3" are stored therein in association with "T-2". Further, "T-1" and "14:50:01" are stored in association with "S-1", "T-2" and "14:50:02" are stored in association with "S-2", and "T-2" and "14:50:03" are stored in association with "S-3" in the session table C.

Upon such an assumption, when having received a packet added with "S-4-10000" at the time "14:50:05" (YES at Step S401), the packet monitor acquires "SA=C", "ID=10000", and "S-4" added to the packet from the received transmission packet and sending packet (Step S402). Because there is "SA=C" in the address information table (YES at Step S403), the packet monitor searches for "S-4" from the session table C (Step S405). Because there is no same session ID (NO at Step S405), the packet monitor stores "S-4" in the SA=C table in association with "T-1", updates "ID=4262" to "ID=10000", and stores "T-1" and "14:50:05" in the session table C in association with "S-4" (Step S406) (see (B) in FIG. 16).

Subsequently, upon reception of a packet added with "S-1-4263" at the time "14:50:06" (YES at Step S401), the packet monitor acquires "SA=C", "ID=4263", and "S-1" added to the packet from the received transmission and sending packets (Step S402). Because there is "SA=C" in the address information table (YES at Step S403), there is "S-1" in the session table C (YES at Step S405), the session ID is not the same as "fS-4" (NO at Step S407), and a calculated difference (−5737) is smaller than the reference ID "−5" (YES at Step S409), the packet monitor searches for "S-4" having the latest start time (Step S411). The packet monitor then deletes "S-4" from the SA=C table, stores "dS-4" in the deleted record, and updates "ID=10000" to "ID=4263" and "fS-4" to "fS-1". Because there is no "dS-4" in "T-2" (NO at Step S412), the packet monitor stores "S-4" in the SA=C table in association with "T-2", updates "ID=32" corresponding to "T-2" to "ID=10000" and "fS-3" to "fS-4", and also updates "T-1" corresponding to "S-4" stored in the session table C to "T-2" (Step S414) (see (C) in FIG. 16).

Subsequently, upon reception of a packet added with "S-2-32" at the time "14:50:07" (YES at Step S401), the packet monitor acquires "SA=C", "ID=32", and "S-2" added to the packet from the received transmission packet and sending packet (Step S402). Because there is "SA=C" in the address information table (YES at Step S403, there is "S-2" in the session table C (YES at Step S405), the session ID is not the same as "fS-4" (NO at Step S407), and the calculated difference (−4231) is smaller than the reference ID "−5" (YES at Step S409), the packet monitor searches for "S-4" in which the start time is the latest (Step S411). The packet monitor then deletes "S-4" corresponding to "T-2" from the SA=C table, stores "dS-4" in association with "T-2", and updates "ID=10000" to "ID=32" and "fS-4" to "fS-2". Because there is "dS-4" in all terminal IDs (YES at Step S412), the packet monitor stores "S-4", "ID=10000", and "fS-4" in the SA=C table in association with "T-3", and updates "T-2" corresponding to "S-4" stored in the session table C to "T-3" (Step S413) (see (D) in FIG. 16).

Effects of Third Embodiment

According to the third embodiment, the identifier and the session ID acquired from the transmission packet are stored in a predetermined storage unit in association with the source address. When the identifier deviates from each identifier corresponding to the same source address stored in the predetermined storage unit by a predetermined degree or more, the session ID and identifier acquired from the transmission packet are classificially stored in the predetermined storage unit. Therefore, after the source indicated by the predetermined source address is detected as the NAPT, it is possible to detect the session ID corresponding to an arbitrarily provided terminal ID. As a result, it is possible to cut and divide a fault location easily. That is, at the time of estimating a fault location of communications in the network by using a packet loss rate, it is understood that a session ID for which a packet loss has occurred is the one added by a terminal device connected via the NAPT. Further, it is possible to determine the terminal device corresponding to the session ID for which the packet loss has occurred by associating an arbitrarily provided terminal ID with the session ID for which the packet loss has occurred, and to estimate that a communication failure has occurred between the NAPT and the terminal device, that is, on the lower network side, in the terminal device in which packet losses have frequently occurred in the same session ID.

Figures 17A, 17B:
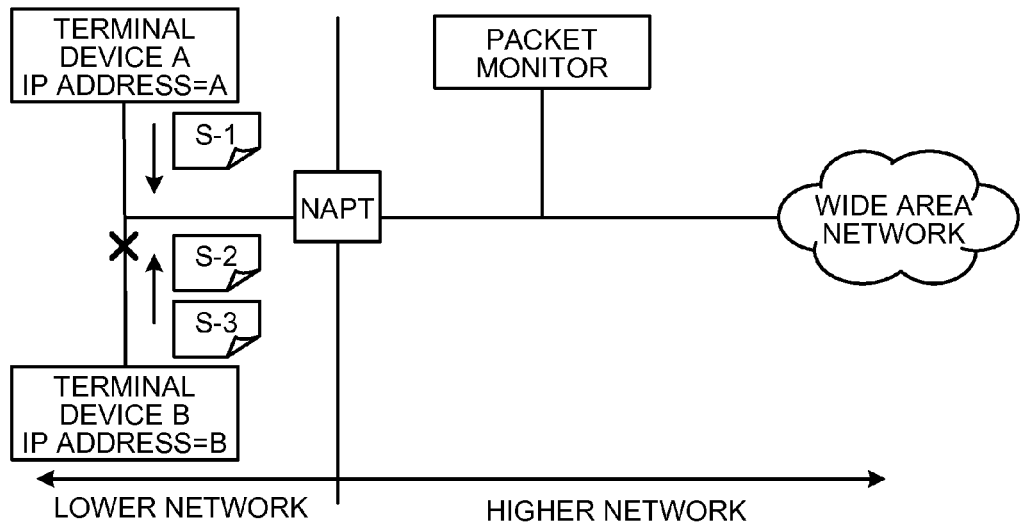
FIGS. 17A and 17B are schematic diagrams for explaining effect of the third embodiment.

A specific example in which a fault location of communications in the network is estimated by using the packet loss rate is explained. As illustrated in FIG. 17A, the NMS receives a packet-loss-rate calculation result in which the session ID (for example, S-1), a destination address (DA) (for example, "E"), a destination port number (DP) (for example, "P-1"), a source address (SA) (for example, "C"), a source port number (SP) (for example, "P-4"), a packet loss rate, and a monitoring start time of a packet added with a predetermined session ID are stored in association with each other, from a packet loss-rate calculator. It is assumed that the NMS receives a monitoring result from the packet monitor 10, in which SA=C is NAPT, "S-1" and "S-2" are session IDs added by different terminal devices, and "S-2" and "S-3" are session IDs added by the same terminal device. FIGS. 17A and 17B are schematic diagrams for explaining effects of the third embodiment.

Upon such an assumption, because the packet loss rate calculated in association with "S-1" is "00", the packet loss rate calculated in association with "S-2" is "4%", and the packet loss rate calculated in association with "S-3" is "5%", it is understood that "S-2" and "S-3" are session IDs in the packet added by one terminal device connected to the lower network of the NAPT. It is also understood that a packet loss has not occurred in "S-1" added by another terminal device connected to the lower network. That is, in the network illustrated in FIG. 17B, it is understood that a communication failure has occurred in the network via the NAPT, and it is possible to estimate that a communication failure has occurred in one terminal device, which adds "S-2" and "S-3" to the packet. As a result, it is possible to estimate that a communication failure has occurred in the lower network and to estimate a terminal device having the communication failure.

[d] Fourth Embodiment

While exemplary embodiments of the present invention have been explained above, the present invention may be carried out by various other modes other than the above embodiments. Other embodiments are explained below as a fourth embodiment of the present invention.

For example, in the first to third embodiments, the example of applying the present invention to a packet monitor has been explained. However, the present invention is not limited thereto, and the invention may also be applied to an information acquisition device (for example, a router) that acquires predetermined information from a packet.

In the first to third embodiments, the example of estimating a fault location of communications in the network based on a packet loss rate has been explained. However, the present invention is not limited thereto, and a fault location of communications in the network may be estimated based on a monitoring result of, for example, transmission delay of a packet.

In the first to third embodiments, the example of determining whether the ID has monotonically increased has been explained. However, the present invention is not limited thereto, and revolution in the increase of ID may be taken into consideration. That is, because the ID is a numerical value specified by 16 bits (for example, "ID=0" to "ID=65535"), for example, it may be determined that the ID has monotonically increased by determining that a difference "−65505" calculated by subtracting "ID=65536" from "ID=30" indicates that the ID has revolved.

In the first to third embodiments, it has been explained that the ID is a numerical value specified by 16 bits (for example, "ID=0" to "ID=65535"). However, the present invention is not limited thereto, and the ID may be a numerical value specified by 8 bits. That is, the ID is specified by 8 bits on left and right and there are cases in which the ID monotonically increases by 8 bits from the left and the ID monotonically increases by 8 bits from the right. The present invention may be applied to either case.

System Configuration

All or a part of the processes explained as being performed automatically may be performed manually, or all or a part of the processes explained as being performed manually may be performed automatically by known methods. That is, for instance in the first to third embodiments, the example in which a monitoring request from an NMS is received, information is acquired from a packet to acquire a monitoring result, and the monitoring result is output to the NMS is explained. However, the present invention is not limited thereto, and the monitoring result may be acquired by performing the processing of a packet monitor by a user. In addition, procedural steps, control steps, specific names, and information including various kinds of data and parameters mentioned in the specification and the drawings (for example, storage information illustrated in FIGS. 3, 4, 10A, 10B, 11, and 14A to 14C and output information illustrated in FIGS. 1, 7A, 7B, 8, 13A, 13B, 16, 17A, and 17B) may be arbitrarily modified unless otherwise specified.

Each structural element of the devices illustrated in the drawings are functional and conceptual, and is not necessarily physically configured as illustrated. That is, the specific mode of distribution and integration of the devices are not limited to the illustrated ones, and all or a part thereof may be functionally or physically distributed or integrated in an arbitrary unit, according to various kinds of load and use (for example, in FIG. 2, the address-information storage unit is integrated to the monitoring-result storage unit). Furthermore, all or an arbitrary part of each processing function performed by the devices may be realized by a central processing unit (CPU), or by a program analyzed and executed in the CPU, or realized as hardware by wired logic.

Information Acquisition Program

Figure 18:
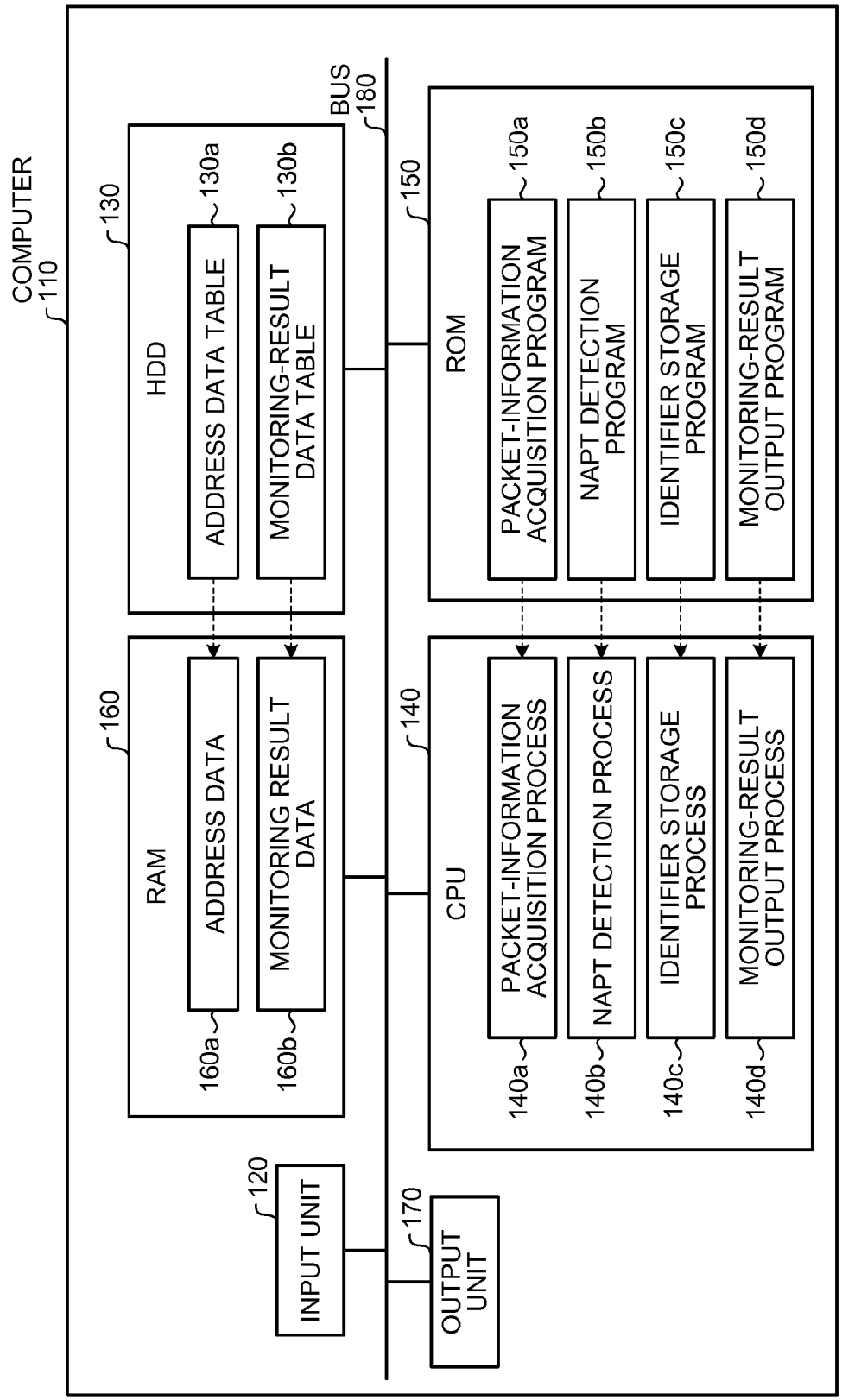
FIG. 18 depicts a computer that executes an information acquisition program.

In the embodiments described above, the example in which various processes are realized based on hardware logic has been explained. However, the present invention is not limited thereto, and various processes may be realized by executing a program prepared in advance by a computer. An example of the computer that executes an information acquisition program including the same functions as those of the packet monitor illustrated in the embodiments is explained with reference to FIG. 18. FIG. 18 depicts a computer that executes the information acquisition program.

As illustrated in FIG. 18, a computer 110 as the packet monitor is configured by connecting an input unit 120, a hard disk drive (HDD) 130, a CPU 140, a read only memory (ROM) 150, a random access memory (RAM) 160, and an output unit 170 by a bus 180 or the like.

The information acquisition program demonstrating the same functions as those of the packet monitor 10 illustrated in the first embodiment, that is, a packet-information acquisition program 150a, a NAPT detection program 150b, an identifier storage program 150c, and a monitoring-result output program 150d are stored in advance in the ROM 150, as illustrated in FIG. 18. These programs 150a to 150d may be appropriately integrated or distributed similarly to the elements of the packet monitor 10 illustrated in FIG. 2.

The CPU 140 reads these programs 150a to 150d from the ROM 150 and executes these programs. Therefore, as illustrated in FIG. 18, these programs 150a to 150d function as a packet-information acquisition process 140a, a NAPT detection process 140b, a trial-identifier storage process 140c, and a monitoring-result output process 140d. The processes 140a to 140d respectively correspond to the packet-information acquiring unit 31, the NAPT detecting unit 32, the identifier storage unit 33, and the monitoring-result output unit 34 illustrated in FIG. 2.

An address data table 130a and a monitoring-result data table 130b are respectively provided to the HDD 130 as illustrated in FIG. 18. The address data table 130a and a monitoring-result data table 130c respectively correspond to the address-information storage unit 21 and the monitoring-result storage unit 22 illustrated in FIG. 2. The CPU 140 reads address data 160a and monitoring result data 160d from the address data table 130a and the monitoring-result data table 130b to store these pieces of data in the RAM 160, and performs processing based on the address data 160a and monitoring result data 160b stored in the RAM 160.

The respective programs 150a to 150d do not need to be stored initially in the ROM 150, and, for example, the respective programs may be stored in a "portable physical medium", such as a flexible disk (FD), a compact disk ROM (CD-ROM), a digital versatile disk (DVD), a magneto-optical disk, or an integrated circuit (IC) card inserted into the computer 110, a "fixed physical medium" such as an HDD provided inside or outside the computer 110, or "another computer (or a server)" connected to the computer 110 via a public line, the Internet, LAN, WAN, or the like, and the computer 110 may read and execute the respective programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information acquisition device comprising:
an acquiring unit that acquires a first group of packets which are transmitted from an address converting and transmitting device receiving a second group of packets from a plurality of terminal devices, converting the source address of the packets of the second group from the address of each of the terminal devices to the address of the address converting and transmitting device, and transmitting, as the first group of packets, the second group of packets with the source address converted, each of the packets of the second group including an address of each of the terminal devices as a source address and an identifier generated by adding a numerical value every time a packet is sent by each of the terminal devices;
an identifier storage unit that stores the identifier in association with the source address included in the first group of packets acquired by the acquiring unit;
an identifier determining unit that determines whether the identifier for a certain source address stored has strongly increased; and
an address converting and transmitting device detector that detects, as the address of the address converting and transmitting device, the certain source address for which the identifier determining unit determines the identifier has strongly increased.

2. The information acquisition device according to claim 1, wherein the identifier determining unit determines whether the identifier included in the first group of packets acquired by the acquiring unit has decreased by a predetermined numerical value or more with respect to the identifier for the certain source address stored.

3. The information acquisition device according to claim 1, wherein the identifier determining unit determines whether the identifier included in the first group of packets acquired by the acquiring unit has increased by a predetermined numerical value or more with respect to the identifier for the certain source address.

4. The information acquisition device according to claim 1, further comprising:
  an identifier-classification storage unit that classifically stores the identifier included in the first group of packets acquired by the acquiring unit if the identifier deviates by a predetermined degree or more from all identifiers corresponding to a same source address stored, and stores the identifier included in the first group of packets acquired by the acquiring unit to overwrite a certain identifier corresponding to the same source address stored if the identifier is approximate to the certain identifier by a predetermined degree or more; and
  a terminal-device counting unit that counts number of identifiers classifically stored by the identifier-classification storage unit as number of the terminal devices connected to the address converting and transmitting device.

5. The information acquisition device according to claim 4, wherein the identifier storage unit stores the identifier and a session ID included in the first group of packets acquired by the acquiring unit in association with the source address, and
  the identifier-classification storage unit classifically stores the session ID and the identifier included in the first group of packets acquired by the acquiring unit together if the identifier deviates by a predetermined degree or more from each identifier corresponding to the same source address stored.

6. The information acquisition device according to claim 1, wherein the identifier storage unit stores the identifier included in the first group of packets acquired by the acquiring unit in association with the source address if an information acquisition request from a network management system that manages a network is received.

7. An information acquisition method at an information acquisition device, the information acquisition method comprising:
  acquiring a first group of packets which are transmitted from an address converting and transmitting device receiving a second group of packets from a plurality of terminal devices, converting the source address of the packets of the second group from the address of each of the terminal devices to the address of the address converting and transmitting device, and transmitting, as the first group of packets, the second group of packets with the source address converted, each of the packets of the second group including an address of each of the terminal devices as a source address and an identifier generated by adding a numerical value every time a packet is sent by each of the terminal devices;
  storing the identifier in association with the source address included in the first group of packets acquired at the acquiring;
  determining whether the identifier for a certain source address stored has strongly increased; and
  detecting, as the address of the address converting and transmitting device, the certain source address for which it is determined that the identifier has strongly increased at the determining.

8. A non-transitory computer readable storage medium having stored therein an information acquisition program causing a computer to execute an information acquisition process at an information acquisition device, the information acquisition process comprising:
  acquiring a first group of packets which are transmitted from an address converting and transmitting device receiving a second group of packets from a plurality of terminal devices, converting the source address of the packets of the second group from the address of each of the terminal devices to the address of the address converting and transmitting device, and transmitting, as the first group of packets, the second group of packets with the source address converted, each of the packets of the second group including an address of each of the terminal devices as a source address and an identifier generated by adding a numerical value every time a packet is sent by each of the terminal devices;
  storing the identifier in association with the source address included in the first group of packets acquired at the acquiring;
  determining whether the identifier for a certain source address stored has strongly increased; and
  detecting, as the address of the address converting and transmitting device, the certain source address for which it is determined that the identifier has strongly increased at the determining.

* * * * *